(12) United States Patent
Kohei et al.

(10) Patent No.: US 6,477,017 B2
(45) Date of Patent: *Nov. 5, 2002

(54) DISK DRIVE AND HEAD SUSPENSION UNIT

(75) Inventors: Toru Kohei, Kawasaki (JP); Yasumasa Kuroba, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,037

(22) Filed: Feb. 5, 1999

(65) Prior Publication Data

US 2001/0040771 A1 Nov. 15, 2001

(30) Foreign Application Priority Data

Feb. 10, 1998 (JP) .............................. 10-028783

(51) Int. Cl.$^7$ .......................... G11B 21/16; G11B 5/48
(52) U.S. Cl. ................................. 360/265.9; 360/266.1
(58) Field of Search ...................... 360/240, 264, 360/264.1, 264.2, 265.7, 265.9, 266.1

(56) References Cited

U.S. PATENT DOCUMENTS

| | | | | |
|---|---|---|---|---|
| 4,760,478 A | * | 7/1988 | Pal et al. ................... | 360/104 |
| 4,797,763 A | * | 1/1989 | Levy et al. ................ | 360/104 |
| 4,819,094 A | * | 4/1989 | Oberg ........................ | 360/104 |
| 4,991,045 A | * | 2/1991 | Oberg ........................ | 360/104 |
| 5,187,625 A | * | 2/1993 | Blaeser et al. ............ | 360/104 |
| 5,572,387 A | * | 11/1996 | Brooks, Jr. et al. ........ | 360/104 |
| 5,623,758 A | * | 4/1997 | Brooks, Jr. et al. ...... | 29/603.01 |
| 5,627,701 A | * | 5/1997 | Misso et al. ............... | 360/106 |
| 5,771,135 A | * | 6/1998 | Ruiz et al. ................. | 360/104 |
| 6,091,578 A | * | 7/2000 | Stole et al. ................ | 360/106 |
| 6,172,852 B1 | * | 1/2001 | Boutaghou et al. ...... | 360/244.5 |

FOREIGN PATENT DOCUMENTS

| | | |
|---|---|---|
| JP | 59-116955 | 7/1984 |
| JP | 60-182075 | 9/1985 |
| JP | 3-189975 | 8/1991 |
| JP | 3-198268 | 8/1991 |
| JP | 3-242878 | 10/1991 |
| JP | 4-364279 | * 12/1992 |
| JP | 5-334827 | 12/1993 |
| JP | 6-89521 | 3/1994 |
| JP | 6-236637 | 8/1994 |
| JP | 7-296354 | 11/1995 |

* cited by examiner

*Primary Examiner*—William Klimowicz
(74) *Attorney, Agent, or Firm*—Greer, Burns & Crain, Ltd.

(57) ABSTRACT

Each arm module includes plate-shaped arms which lie on top of each other. A head slider is supported by the extending end of each arm module and faces a data recording surface of a magnetic disk. An actuator drives each arm module. Each arm module has a structure in which the plate-shaped arms which lie on top of each other are integrated with each other.

37 Claims, 25 Drawing Sheets

$W_1 > W_2$

DISK DRIVE AND HEAD SUSPENSION UNIT

BACKGROUND OF THE INVENTION

1. Field of the Invention

The present invention relates to a disk drive, and, in particular, to a small-sized disk drive and a head suspension unit loaded in a small-sized computer.

Recently, reduction in thickness, improvement in a processing performance and improvement in shock resistance in consideration of erroneous dropping are demanded for a portable small-sized computer. For a 2.5-inch-size magnetic disk drive which is loaded in a portable small-sized computer, not only reduction in thickness but also a large storage capacity in response to improvement in a CPU's processing performance, and superiority in shock resistance such that, when the computer is erroneously dropped, an arm supporting a head slider is prevented from hitting a magnetic disk are demanded.

In order to increase the storage capacity without increasing the size of the magnetic disk, it is necessary to reduce the pitch of the recording tracks and thus increase the number of the recording tracks. When the pitch of the recording tracks is reduced from 3 $\mu$m which is the pitch in the current magnetic disk to 1 $\mu$m, for example, it is necessary to improve the positioning accuracy of the head slider to the order of nanometers. In order to improve the positioning accuracy of the head slider, it is necessary to reduce the amplitude of vibration in directions parallel to the data recording surface of the magnetic disk (directions in which the head slider performs the seeking operation) of the arm supporting the head slider when resonance occurs. For this purpose, it is necessary to increase the resonance frequency of the vibration by improving the rigidity of the arm.

In order to improve the shock resistance, it is necessary to reduce the amount of bending of the arm in the direction in which the extending end of the arm approaches the magnetic disk, by improving the rigidity of the arm.

2. Description of the Related Art

A 2.5-inch-size magnetic disk drive 10 in the related art has an arrangement, as shown in FIGS. 1A and 1B, in which two 2.5-inch-size magnetic disks 12-1, 12-2 are assembled in a housing 11, these magnetic disks being rotated by a motor (not shown in the figures). Further, a head suspension unit 13 is assembled in the housing 11, the head suspension unit 13 being rotated by an actuator 14. FIG. 1B shows a magnified sectional view taken along the B—B line shown in FIG. 1A.

As shown in FIG. 2, in the head suspension unit 13, an arm 21-1, a spacer 22-1, an arm 21-2, an arm 21-3, a spacer 22-2 and an arm 21-4 are fitted around a sleeve 20, are stacked in the stated order, and are fixed by a screw member 23. The sleeve 20 is assembled around a fixed central shaft 25 via bearings 24-1, 24-2 so that the sleeve 20 can rotate.

At the extending ends of the arm 21-1 through 21-4, suspensions 26-1 through 26-4 are fixed, respectively. At the extending ends of the suspensions 26-1 through 26-4, head sliders 27-1 through 27-4 are fixed, respectively.

The arm 21-1 is positioned below the magnetic disk 12-2, the arms 21-2, 21-3 are positioned between the magnetic disks 12-1 and 12-2, and the arm 21-4 is positioned above the magnetic disk 12-1. The head slider 27-1 is in contact with the bottom surface of the magnetic disk 12-2, the head slider 27-2 is in contact with the top surface of the magnetic disk 12-2, the head slider 27-3 is in contact with the bottom surface of the magnetic disk 12-1 and the head slider 27-4 is in contact with the top surface of the magnetic disk 12-1.

The vibration-frequency responding characteristics in directions parallel to the data recording surfaces of the magnetic disks (the directions in which the head sliders perform the seeking operation) of the extending ends of the respective arms 21-1 through 21-4 in the condition where the suspensions and head sliders are attached thereto in the above-described head suspension unit 13 will now be considered.

In FIG. 8, the curve II indicated by the broken line shows the vibration-frequency responding characteristics in the directions parallel to the data recording surfaces of the magnetic disks (the directions in which the head sliders perform the seeking operation) of the extending ends of the upper arm 21-1 and the lower arm 21-4 when a test the same as that which will be described later is performed. The peak P2 appears at the frequency f2 and the amplitude of the peak P2 is L2.

Both the vibration-frequency responding characteristics in the directions parallel to the data recording surface of the magnetic disks (the directions in which the head sliders perform the seeking operation) of the extending end of the arm 21-2 and the vibration-frequency responding characteristics in the directions parallel to the data recording surfaces of the magnetic disks (the directions in which the head sliders performs the seeking operation) of the extending end of the arm 21-3 are the same as those shown by the curve II indicated by the broken line. This is because the arms 21-2 and 21-3 merely lie on top of one another.

The frequency f2 is somewhat low and the amplitude L2 is somewhat high. This feature can be obtained both in the resonance characteristics of the vibration of the arm in the directions parallel to the data recording surfaces of the magnetic disks and in the resonance characteristics of the vibration of the arm in the directions perpendicular the data recording surfaces of the magnetic disks. Therefore, improvement in the positioning accuracy of the head sliders is difficult, and, also, it is difficult to reduce the pitch of the recording tracks, increase the number of recording tracks, and, thus, increase the storage capacity of the magnetic disks.

Further, because the arms 21-2 and 21-3 merely lie on top of one another, due to variation in dimension accuracies of the arms, variation in assembling, and so forth, there is a case where extending-end portions of the arms 21-2 and 21-3 are in contact with one another, as shown in FIG. 3A, and, also, there is a case where the extending-end portions of the arms 21-2 and 21-3 are away from and are not in contact with. one another, as shown in FIG. 3B, depending on particular magnetic disk drives 10. In FIG. 3B, a space 28 is present between the arms 21-2 and 21-3. Such variation in the assembling condition results in variation in the vibration characteristics of the head suspension unit 13. Therefore, the servo circuit for performing the seeking operation should be designed in consideration of safety for preventing the servo system from oscillating. Also in this view point, it is difficult to improve the positioning accuracy of the head sliders, and, therefore, to increase the storage capacity of the magnetic disks.

A case where the magnetic disk drive 10 is erroneously dropped onto a floor will now be considered.

Due to a shock when the magnetic disk drive 10 is dropped onto a floor, a force F is applied to the extending end of each of the arms 21-1 through 21-4, which force F depends on the weight of a respective one of the head sliders 27-1 through 27-4.

Each of the top arm 21-4 and the bottom arm 21-1 bends as shown in FIG. 4A, and the bending amount of the extending end thereof is δ2.

Similarly, each of the intermediate arms 21-2 and 21-3 bends as shown in FIG. 4B, and the bending amount of the extending end thereof is also δ2.

In order to reduce the thickness of the magnetic disk drive 10, the space 'g' between the magnetic disks 12-1 and 12-2 is approximately 1.8 mm, and, thus, is small. Also, the space 'a' between the extending end of each of the arms 21-1 through 21-4 and a respective one of the magnetic disks 12-1 and 12-2 is approximately 300 μm, and, thus, is small (see FIG. 1B). Therefore, it is difficult to reduce the thickness of each of the arms 21-1 through 21-4. As a result, when the magnetic disk drive 10 is dropped to a floor, there is a possibility that the bending amount δ2 is so large that the extending ends of the arms 21-1 through 21-4 hit the magnetic disks 12-1 and 12-2.

When the extending ends of the arms 21-1 through 21-4 hit the magnetic disks 12-1 and 12-2, dust is produced, a head crash is likely to occur, and the data recording surfaces of the magnetic disks 12-1 and 12-2 may be damaged.

Further, there is a case where, when the magnetic disk drive 10 is dropped onto a floor, as shown in FIG. 4C, the arms 21-2 and 21-3 bend so as to be away from one another. Then, the arms 21-2 and 21-3 approach one another and hit one another. Also at this time, dust is produced.

Thus, the magnetic disk drive having the above-described arrangement is also problematic in view of the shock resistance.

Increasing the thickness of each arm in order to improve the shock resistance can be considered. However, when the thickness of each arm is increased, because the space 'g' between the magnetic disks 12-1 and 12-2 cannot be increased, it is necessary to provide one intermediate arm, instead of the two intermediate arms, the suspensions and head sliders being provided on both surfaces, respectively, of the one intermediate arm. In this case, if it is determined that only one of the two head sliders on the one intermediate arm is defective when testing for recording and reproducing a signal is performed using a test disk which is scanned by the head sliders, this intermediate arm cannot be used in the head suspension unit. Thus, the productivity of the head suspension unit is not high.

SUMMARY OF THE INVENTION

An object of the present invention is to provide a disk drive and a head suspension unit in which the above-described problems are eliminated.

A disk drive according to the present invention comprises:

a disk which is rotated;

an arm module which comprises a plurality of plate-shaped arms which lie on top of each other;

a head slider which is supported by the extending end of the arm module and faces the disk; and an actuator-which drives the arm module, wherein the arm module has an arrangement in which the plurality of plate-shaped arms which lie on top of each other are integrated with each other.

A head suspension unit, used in a disk drive, according to the present invention comprises:

an arm module which comprises a plurality of plate-shaped arms which lie on top of each other; and a head slider which is supported by the extending end of the arm module, wherein the arm module has an arrangement in which the plurality of plate-shaped arms which lie on top of each other are integrated with each other.

In each of these arrangements, because the plurality of arms which lie on top of each other are integrated with each other, in comparison to a case where the plurality of arms merely lie on top of each other, the rigidity of the plurality of arms is higher. When the rigidity of the plurality of arms is higher, the resonance frequency of vibration of the plurality of arms increases, the amplitude of the vibration of extending ends of the arms when resonance occurs can be reduced, and the positioning accuracy of the head slider is improved.

Further, because the plurality of arms which lie on top of each other are integrated with each other, variation in the vibration characteristics among particular assembled arm modules is lower in comparison to cases of the related art, and is substantially eliminated. Thereby, the constants of the servo system which performs positioning of the head slider can be fixed, and high-accuracy positioning in a higher-frequency band can be performed in any one of assembled magnetic disk drives. Also by this reason, the positioning accuracy of the head slider is improved.

Further, as a result of the rigidity of the arms being higher, the extending end of each arm is unlikely to bend to approach the disk when shock is applied to the disk drive. Therefore, the extending end of each arm is unlikely to hit the disk, and, thereby, production of dust in the disk drive can be controlled. As a result, occurrence of a head crash can be avoided even in a case where the head slider floats above the disk with a small floating distance.

Overall, shock resistance can be improved and the storage capacity can be increased.

Each arm of the arm module may have a rib along a side edge thereof. Thereby, the rigidity of each arm becomes higher. As a result, the positioning accuracy of the head slider is improved, and shock resistance is improved.

The plurality of plate-shaped arms which lie on top of each other may be integrated as a result of extending-end portions thereof being fixed to each other. In this arrangement, in comparison to a case where the arms are fixed to each other through the entire length thereof, manufacturing of the arm module can be easily performed.

The plurality of plate-shaped arms which lie on top of each other may be integrated as a result of extending-end portions thereof being caused to adhere. In this arrangement, adhesive used for the adhesion exhibits a viscous damping effect. Thereby, the amplitude of vibration of the arms when resonance occurs decreases. When the amplitude of vibration decreases, the positioning accuracy of the head slider is improved.

The plurality of plate-shaped arms which lie on top of each other are integrated as a result of extending-end portions thereof being caused to adhere by using a piece of a double-sided tape.

In a case where arms are caused to adhere as a result of adhesive being coated, a work of coating the adhesive is needed. Also, the amount of the coated adhesive may vary, and, as a result, the characteristics of the thus-manufactured arm module may vary among particular products. In contrast to this, in the case where the piece of the double-sided tape is used for causing the arms to adhere, the portions at which the arms are caused to adhere can be made uniform, as a result of the size of the piece of the double-sided tape being controlled. As a result, it is possible to manufacture the arm module with little variation in the characteristics thereof. Also, the arm module can be easily manufactured. Further, a sheet and adhesive layers of the piece of the double-sided tape exhibit a viscous damping effect. As a result, it is possible to reduce the amplitude of the peak of vibration of the arms when resonance occurs. As a result, the head slider is positioned with high accuracy.

The plurality of plate-shaped arms which lie on top of each other may be integrated as a result of extending-end portions thereof being welded together. In this arrangement, the extending end portions of the arms are firmly fixed to each other.

The disk drive may comprise a plurality of arm modules, each of which comprises a plurality of plate-shaped arms which lie on top of each other, the plurality of arm modules lining up vertically, and, except the lowest one, having openings through which a laser beam passes, respectively, the sizes of the openings of each pair of adjacent arm modules of the plurality of arm modules being such that the opening of the upper arm module is larger than the opening of the lower arm module, wherein the plurality of arms of each arm module are integrated as a result of extending-end portions thereof being welded together by the laser beam which has passed through the openings of the higher arm modules.

In this arrangement, in the case where the plurality of arm modules line up vertically, it is possible to perform welding of the extending-end portions of the arms of each arm module after base portions of the arms are fixed. Thus, assembling of the head suspension unit can be easily performed. Further, no unnecessary stress is applied to the portions at which the arms are welded. As a result, the positioning accuracy of the head slider is not degraded.

The plurality of plate-shaped arms which lie on top of each other may be integrated as a result of side faces of extending-end portions thereof being welded together. In this arrangement, because welding is performed from the side of the arms, welding is performed after the arms are caused to lie on top of one another and base portions of all the arms are fixed. As a result, no unnecessary stress is applied to the welded portions, and, therefore, the positioning accuracy of the head slider is not degraded. Further, the head suspension unit can be assembled with high work efficiency.

The plurality of plate-shaped arms which lie on top of each other may comprise two arms and may be integrated as a result of a projection formed on one of the two arms being press-fitted into an opening formed in the other of the two arms. In this arrangement, because work to be performed is mere press-fitting work, the arm module can be manufactured easily in comparison to the case where welding work is performed.

The plurality of plate-shaped arms which lie on top of each other may be integrated by using an eyelet member. In this arrangement, because work to be performed is mere work of inserting and deforming the eyelet member, the arm module can be manufactured easily in comparison to the case where welding work is performed.

The plurality of plate-shaped arms which lie on top of each other may be integrated as a result of extending-end portions thereof pushing each other. In this arrangement, because adhesion work or the like is not necessary, the arm module can be manufactured easily.

The plurality of plate-shaped arms which lie on top of each other may be integrated as a result of being fixed to each other through the entire length thereof. In this arrangement, in comparison to the case where only the extending-end portions of the arms are fixed to each other, the rigidity of the arms is higher.

The plurality of plate-shaped arms which lie on top of each other may be integrated as a result of extending-end portions thereof being fixed to each other and portions near to base portions thereof being fixed. In this arrangement, because also the portions near to the base portions of the arms are fixed, the rigidity of the arm module is higher.

The plurality of plate-shaped arms which lie on top of each other may comprise two arms, and a wiring path for a lead wire may be formed between the two arms. Because the lead wire is caused to pass through the wiring path, the lead wire is prevented from coming into contact with the disk.

Other objects and further features of the present invention will become more apparent from the following detailed description when read in conjunction with the accompanying drawings.

DETAILED DESCRIPTION OF THE PREFERRED EMBODIMENTS

Figure 5A:
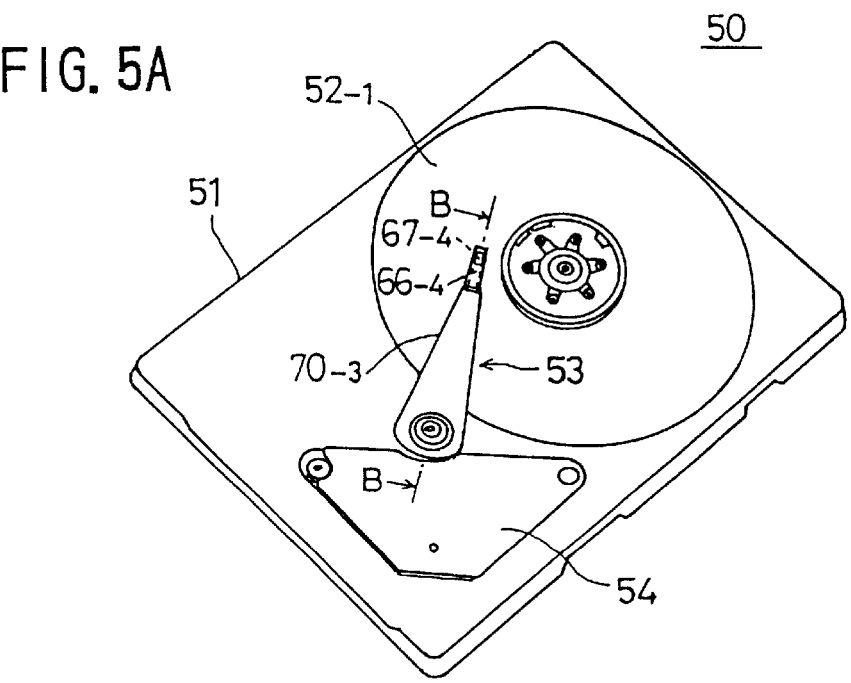
FIGS. 5A and 5B show a magnetic disk drive in a first embodiment of the present invention.
Figure 5B:
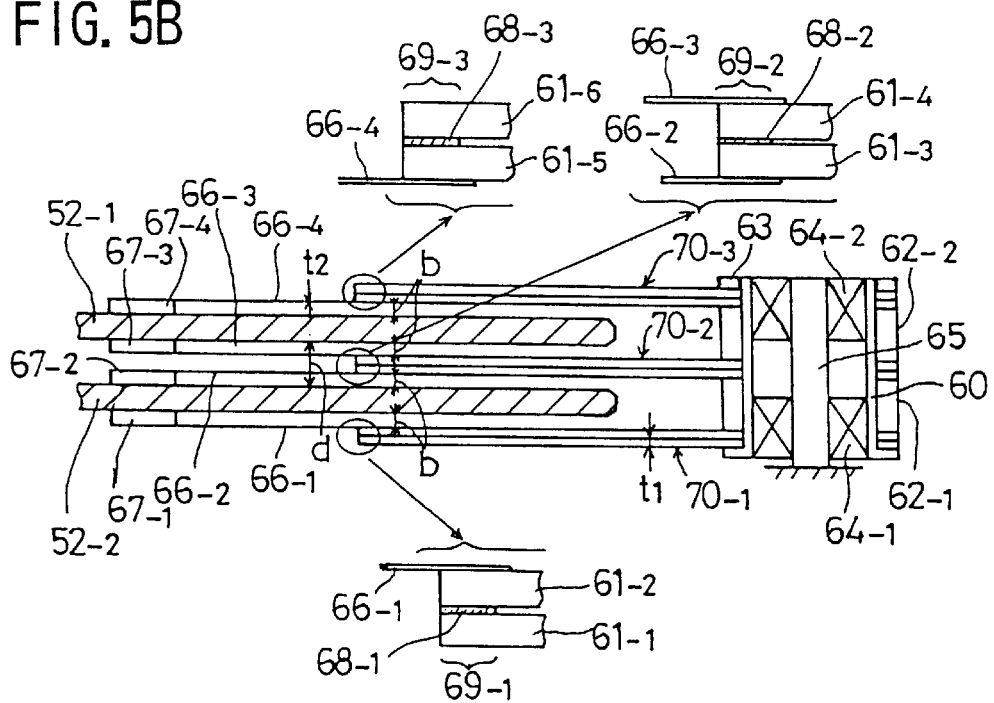

As shown in FIGS. 5A and 5B, a 2.5-inch-size magnetic disk drive 50 in a first embodiment of the present invention has an arrangement in which, in a housing 51, two 2.5-inch-size magnetic disks 52-1, 52-1 are assembled, which magnetic disks 52-1, 52-2 are rotated by a motor (not shown in the figures). Further, a head suspension unit 53 is assembled in the housing 51, which head suspension unit 53 is rotated by an actuator 54. FIG. 5B shows a magnified sectional view taken along the B—B line shown in FIG. 5A.

Figure 6:
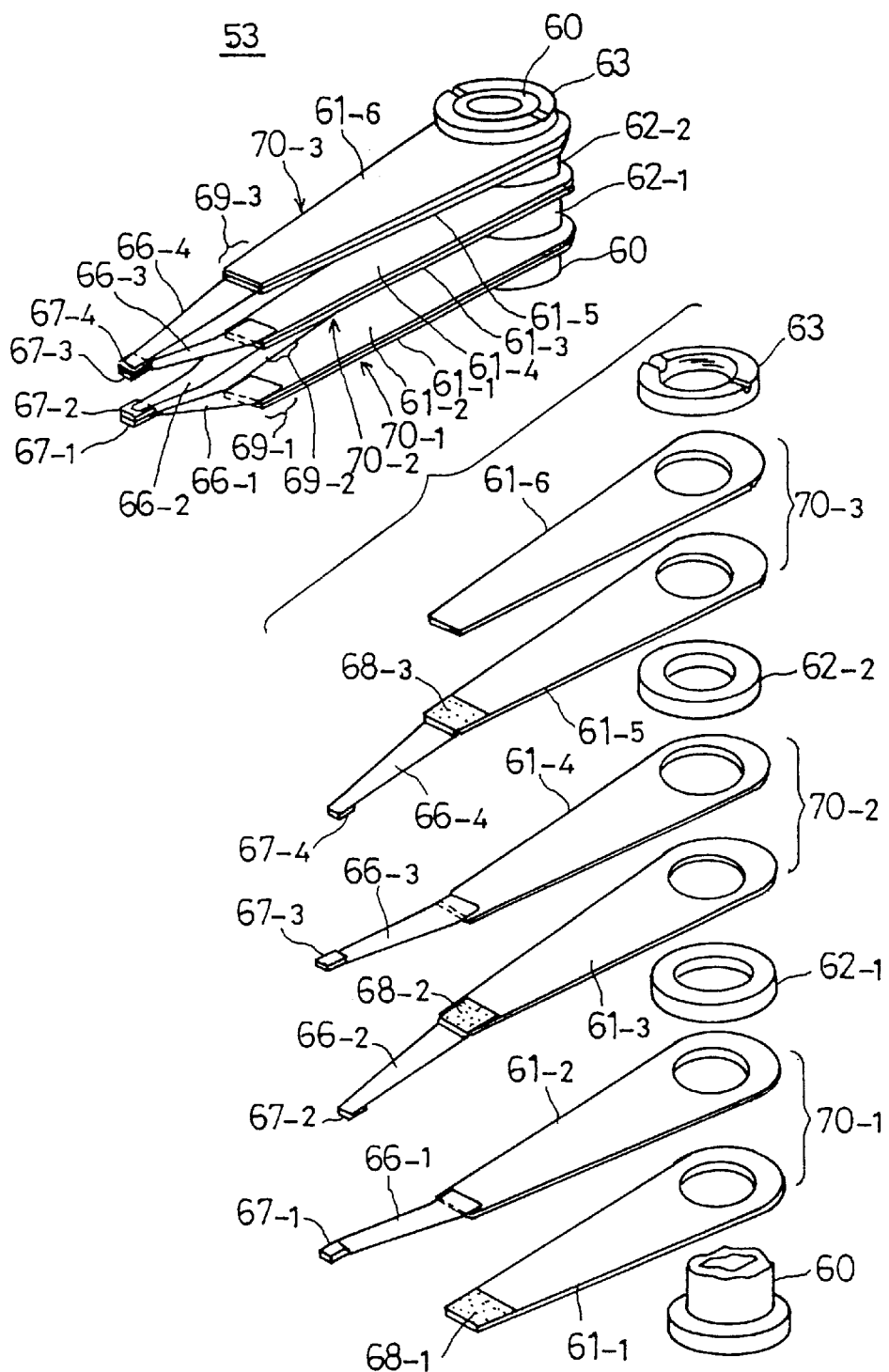
FIG. 6 shows a head suspension unit shown in FIGS. 5A and 5B.

As shown in FIGS. 5B and 6, in the head suspension unit 53, an arm 61-1, an arm 61-2, a spacer 62-1, an arm 61-3, an arm 61-4, a spacer 62-2, an arm 61-5 and an arm 61-6 are fitted around a sleeve 60, are stacked in the stated order, and are fixed by a screw member 63, which is screwed on the top of the sleeve 60, to the sleeve 60. The sleeve 60 is assembled around a fixed central shaft 65 via bearings 64-1, 64-2 so that the sleeve 60 can rotate about the shaft 65.

On extending-end portions of the arms 61-2 through 61-5, suspensions 66-1 through 66-4 are fixed, respectively. On extending-end portions of the suspensions 66-1 through 66-4, head sliders 67-1 through 67-4 are fixed, respectively.

The arms 61-1 through 61-6 have the same shape, and are made of stainless steel. The thickness t1 of each arm is approximately 200 µm, and, thus, each arm is thin. The suspensions 66-1 through 66-4 have the same shape, and are made of stainless steel. The thickness t2 of each suspension is approximately 20 µm, and, thus, each suspension is further thin. The head sliders 67-1 through 67-4 are so-called pico-sliders. On one end surface of each head slider, an inductance head for recording and a head for reproducing using a magnetoresistive-effect element or a giant magnetoresistive-effect element are formed in a thin-film forming manner. The space 'd' between the magnetic disks 52-1 and 52-2 is approximately 1.8 mm, and, thus, the space 'd' is narrow. The space 'b' between the extending end of each of the arms 61-2 through 61-5 and a respective one of the magnetic disks 52-1 and 52-2 is approximately 300 µm, and, thus, the space 'b' is narrow. Thereby, the magnetic disk drive 50 is thin.

The arms 61-1 and 62-2 are positioned below the magnetic disk 52-2, the arms 62-3 and 62-4 are positioned between the magnetic disks 52-1 and 52-2, and the arms 61-5 and 61-6 are positioned above the magnetic disk 52-1. The head slider 67-1 is in contact with the bottom surface of the magnetic disk 52-2, the head slider 67-2 is in contact with the top surface of the magnetic disk 52-2, the head slider 67-3 is in contact with the bottom surface of the magnetic disk 52-1, and the head slider 67-4 is in contact with the top surface of the magnetic disk 52-1.

Base portions of the arms 61-1 and 61-2 are sandwiched by the spacer 62-1 and a bottom portion of the sleeve 60, and extending-end portions of the arms 61-1 and 61-2 are caused to adhere by using adhesive 68-1, as shown in a partial magnified view included in FIG. 5B. Thus, the arms 61-1 and 61-2 lie on top of one another so as to be integrated with one another, and are referred to as an arm module 70-1. Base portions of the arms 61-3 and 61-4 are sandwiched by the spacers 62-1 and 62-2, and extending-end portions of the arms 61-3 and 61-4 are caused to adhere by using adhesive 68-2, as shown in a partial magnified view included in FIG. 5B. Thus, the arms 61-3 and 61-4 lie on top of one another so as to be integrated with one another, and are referred to as an arm module 70-2. Base portions of the arms 61-5 and 61-6 are sandwiched by the spacer 62-2 and the screw member 63, and extending-end portions of the arms 61-5 and 61-6 are caused to adhere by using adhesive 68-3, as shown in a partial magnified view included in FIG. 5B. Thus, the arms 61-5 and 61-6 lie on top of one another so as to be integrated with one another, and are referred to as an arm module 70-3. In the partial magnified views of FIG. 5B, each of the adhesives 68-1, 68-2 and 68-3 has a thickness. However, this is for the sake of illustration. Actually, the thickness of each of the adhesives 68-1, 68-2 and 68-3 is so small as to be able to be ignored, the facing surfaces of each pair of arms of each arm module are in contact with one another, and there is no space between each pair of arms of each arm module. As shown in the partial magnified views of FIG. 5B, the pairs of arms of the arm modules 70-1, 70-2 and 70-3 are caused to adhere at portions 69-1, 69-2 and 69-3, respectively. The adhesives 68-1, 68-2 and 68-3 are of a resin family, have relatively high flowability, and have relatively high rigidity after going solid.

If the base portions are sandwiched, and, thus, are fixed after the extending-end portions of the arms are caused to adhere by using the adhesive, an unnecessary internal stress may be developed in the pair of arms, due to position difference between the pair of arms, when the base portions are sandwiched, and, thus, are fixed. When such an unnecessary internal stress is developed in the arms, the positioning accuracies of the head sliders are adversely affected thereby. In order to eliminate such a problem, the above-mentioned adhesion by using the adhesives is performed in the following manner: the adhesive is coated on the extending-end portion of one arm of the pair of arms of each arm module; the pair of arms are caused to lie on top of one another; the base portions of the arms are sandwiched, and, thus, fixed; and, then, the extending-end portions of the arms are compressed. As a result, no unnecessary internal stress is developed in the pair of arms of each arm module in the condition where the base portions are sandwiched, and, thus, are fixed.

The mechanical characteristics and the vibration characteristics of the arm modules 70-1, 70-2 and 70-3 will now be described.

In the arm module 70-2 (70-1, 70-3), because the base portions of the arms 61-3 and 61-4 are sandwiched and fixed, and the extending-end portions thereof are caused to adhere by using the adhesive, the arm module 70-2 has a rigidity approximately equal to the rigidity of an arm having a thickness which is twice the thickness t1.

Figure 4A:
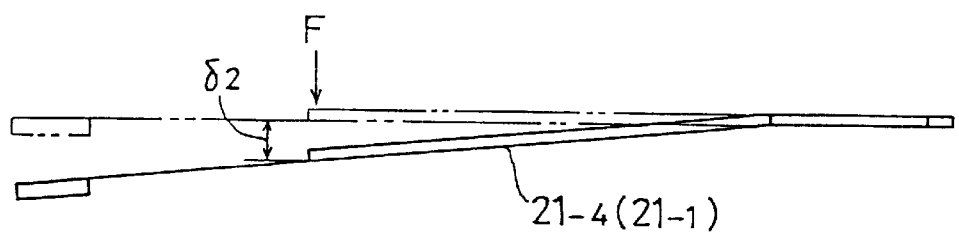
FIGS. 4A, 4B and 4C show bending of arms in the magnetic disk drive.
Figure 4B:
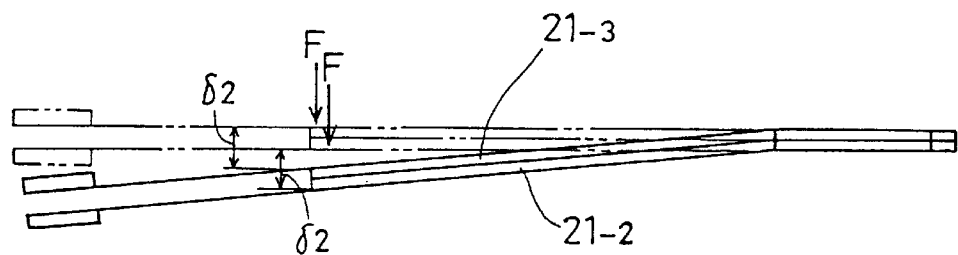
Figure 4C:
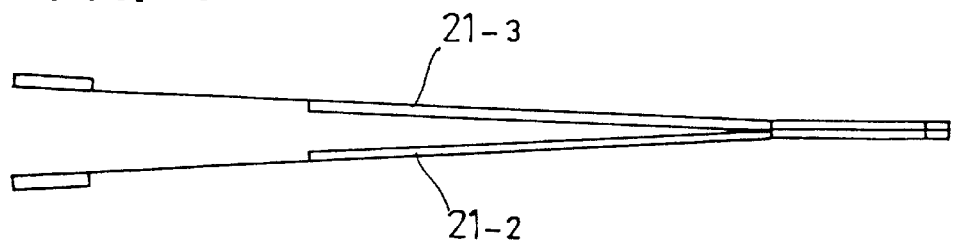
Figure 7:
FIG. 7 illustrates rigidity of an arm module.

As shown in FIG. 7, a case where a force 2XF is applied to the arm module 70-2 in the vertical direction will now be considered. The reason why the applied force is twice the force F (2×F) is that the arm module 70-2 supports the two head sliders 67-2 and 67-3. The arm module 70-2 bends as shown in FIG. 7 and the bending amount at the extending end is δ1. This bending amount δ1 is approximately δ2/8 where δ2 is the bending amount in the case of the arm in the related art shown in FIGS. 4A and 4B.

Further, because the extending-end portions of the arms 61-3 and 61-4 are caused to adhere by using the adhesive in the arm module 70-2 (70-1, 70-3), even if the arms 61-3 and 61-4 were manufactured with variation in dimensions, variation in assembling and so forth, the extending-end portions of the arms 61-3 and 61-4 are in contact with one another without fail.

Figure 8:
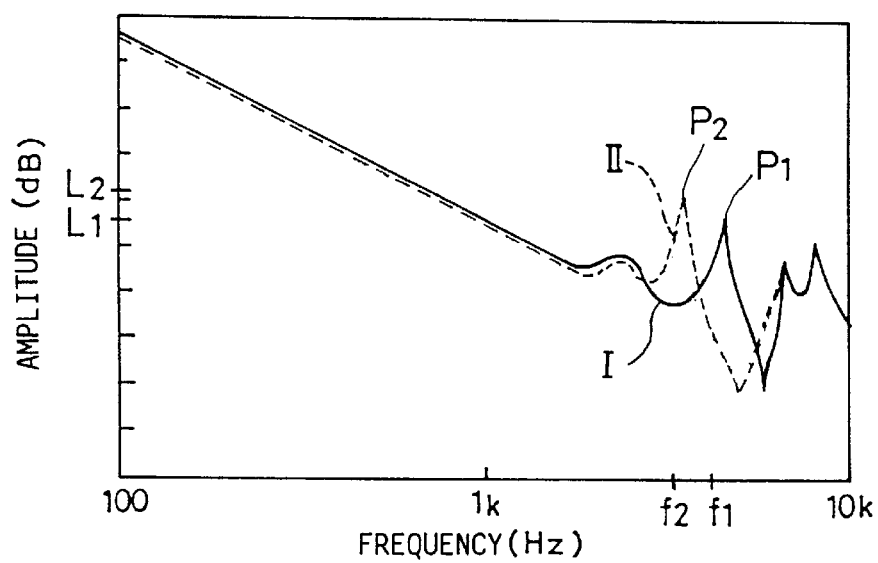
FIG. 8 shows vibration-frequency responding characteristics of an extending end of the arm module.

Further, the vibration-frequency responding characteristics of the extending end of each of the arm modules 70-1, 70-2 and 70-3 in directions parallel to the data recording surfaces of the magnetic disks (directions in which the head sliders perform the seeking operation) were measured. This measurement was performed in the following manner: the head suspension unit 53 was set in a testing equipment; a driving signal of a sine wave was applied to an actuator corresponding to the above-mentioned actuator 54; the frequency of the sine wave was gradually increased; and the vibration of the extending end of each of the arm modules 70-1, 70-2 and 70-3 in the directions parallel to the data recording surfaces of the magnetic disks (directions in which the head sliders perform the seeking operation) were measured. By this measurement, the result represented by the curve I shown in FIG. 8 was obtained. The frequency at which the peak P1 appears is f1 and the amplitude of the peak P1 is L1.

The frequency f1 at which the peak P1 appears is $\sqrt{2}$ times as high as the frequency f2 at which the peak P2 appears in the case of the arm in the related art. This is because the arm module 70-2 (70-1, 70-3) has the rigidity approximately equal to the rigidity of an arm which is as twice as thick as the thickness t1. As the frequency f1 at which the peak P1 appears is higher than the frequency f2 in the case of the related art, the amplitude L1 of the peak P1 is lower than the amplitude L2 in the case of the related art.

Another reason why the amplitude L1 of the peak P1 is low is that, in a microscopic view, the adhesive 68-2 exhibits a viscous damping effect.

In each of the responding characteristics of vibration in the seeking directions of the extending end of the arm module 70-2 (70-1, 70-3) and the responding characteristics of vibration in directions perpendicular to the data recording surfaces of the magnetic disks, in comparison to the case of the arm in the related art, the frequency at which the peak appears is higher and the amplitude of the peak is lower.

The magnetic disk drive 50 having the above-described arrangement has the following advantages in comparison to the magnetic disk drive in the related art:

(1) It is possible to increase the storage capacity.

This is because, by the reasons which will be described below, the positioning accuracies of the head sliders are improved, and, as a result, it is possible to reduce the pitch of the recording tracks on the magnetic disks so as to increase the number of recording tracks, thereby high density recording being able to be performed.

The reasons why the positioning accuracies of the head sliders are improved will now be described.

i) The amplitude L1 of the peak P1 in the responding characteristics of vibration of the extending ends of the arm modules 70-1, 70-2 and 70-3 in the directions parallel to the data recording surfaces of the magnetic disks is low.

This is because, first, in the arm module 70-2 (70-1, 70-3), the extending-end portions of the arms 61-3 and 61-4, which lie on top of one another in the condition in which the base portions thereof are sandwiched and fixed, are caused to adhere by using the adhesive 68-2, and, second, the adhesive 68-2 exhibits a viscous damping effect.

ii) Even if the arms 61-3 and 61-4 were manufactured with variation in dimensions, variation in assembling and so forth, the extending-end portions of the arms 61-3 and 61-4 are stably in contact with one another without fail. Thereby, there is no variation in the vibration characteristics of the respective arm modules 70-1, 70-2 and 70-3. As a result, it is possible to fix the constants of the servo circuit which causes the actuator 54 to move the head sliders, and, thus, performs positioning of the head sliders. As a result, in any one of assembled magnetic disk drives 50, high-accuracy positioning in a higher frequency band can be performed.

(2) The magnetic disk drive 50 has high shock resistance.

In the arm module 70-2 (70-1, 70-3), the extending-end portions of the arms 61-3 and 61-4, which lie on top of one another in the condition where the base portions thereof are sandwiched and fixed, are caused to adhere by using the adhesive 68-2. As a result, the rigidity of the arm module 70-2 is high, and the bending amount in the case where a load is applied to the extending end of the arm module 70-2 is small. As a result, shock applied to the magnetic disk drive 50 when the magnetic disk drive 50 is dropped onto a floor from a normal height does not cause the extending ends of the arm module 70-2 (70-1, 70-3) to come into contact with the surfaces of the magnetic disk 52-1 or 52-2.

(3) A head crash is not likely to occur.

In order to achieve high-density recording, it is necessary to reduce the floating amounts of the head sliders to extremely small values. When the floating amounts of the head sliders are extremely small, a head crash is likely to occur. However, when shock is applied to the magnetic disk drive 50, the extending end of the arm module 70-2 (70-1, 70-3) does not come into contact with the surface of the magnetic disk 52-1 or 52-2, and, also, the arms 61-3 and 61-4 do not hit one another. As a result, production of dust which causes a head crash can be prevented. Thus, a head crash is not likely to occur.

In the above-described embodiment, only the extending-end portions of the arms, which lie on top of one another, are caused to adhere by using the adhesive. However, it is also possible that the arms are caused to adhere by using the adhesive through the entire lengths thereof.

Other embodiments of the present invention will now be described. From now, head suspension units will be described.

Figure 9:
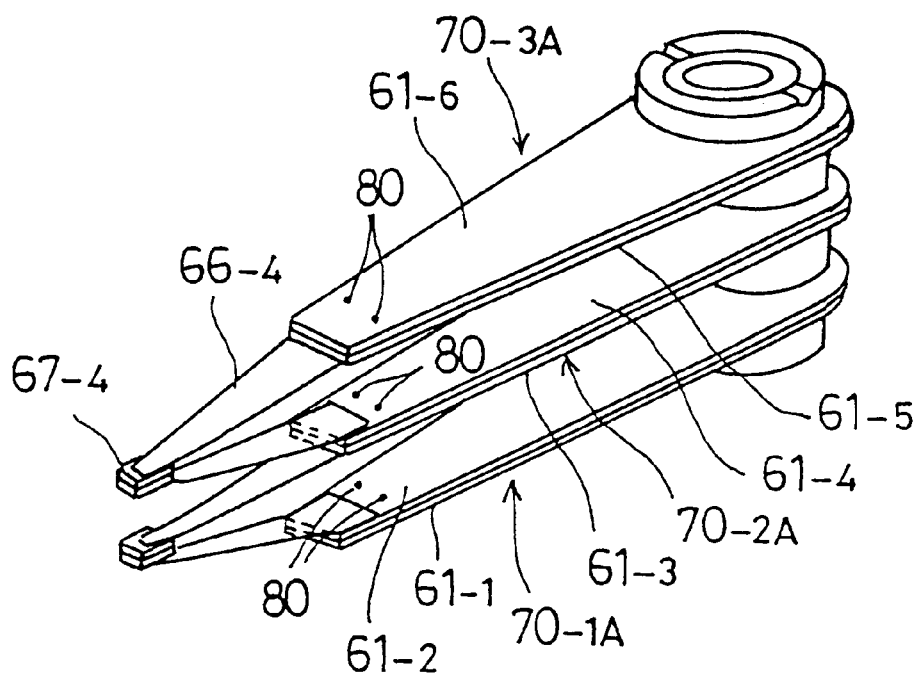
FIG. 9 shows a head suspension unit in a second embodiment of the present invention.

FIG. 9 shows a head suspension unit 53A in a second embodiment of the present invention. The head suspension unit 53A is the same as the head suspension unit 53 shown in FIG. 6, except for arm modules 70-1A, 70-2A and 70-3A.

In each of the arm modules 70-1A, 70-2A and 70-3A, the extending-end portions of respective ones of the arms 61-1, 61-2, arms 61-3, 61-4 and arms 61-5, 61-6 are fixed to one another through laser-beam spot welding instead of adhesion using the adhesive. In FIG. 9, laser-beam spot welding is performed at the portions 80.

Figure 10:
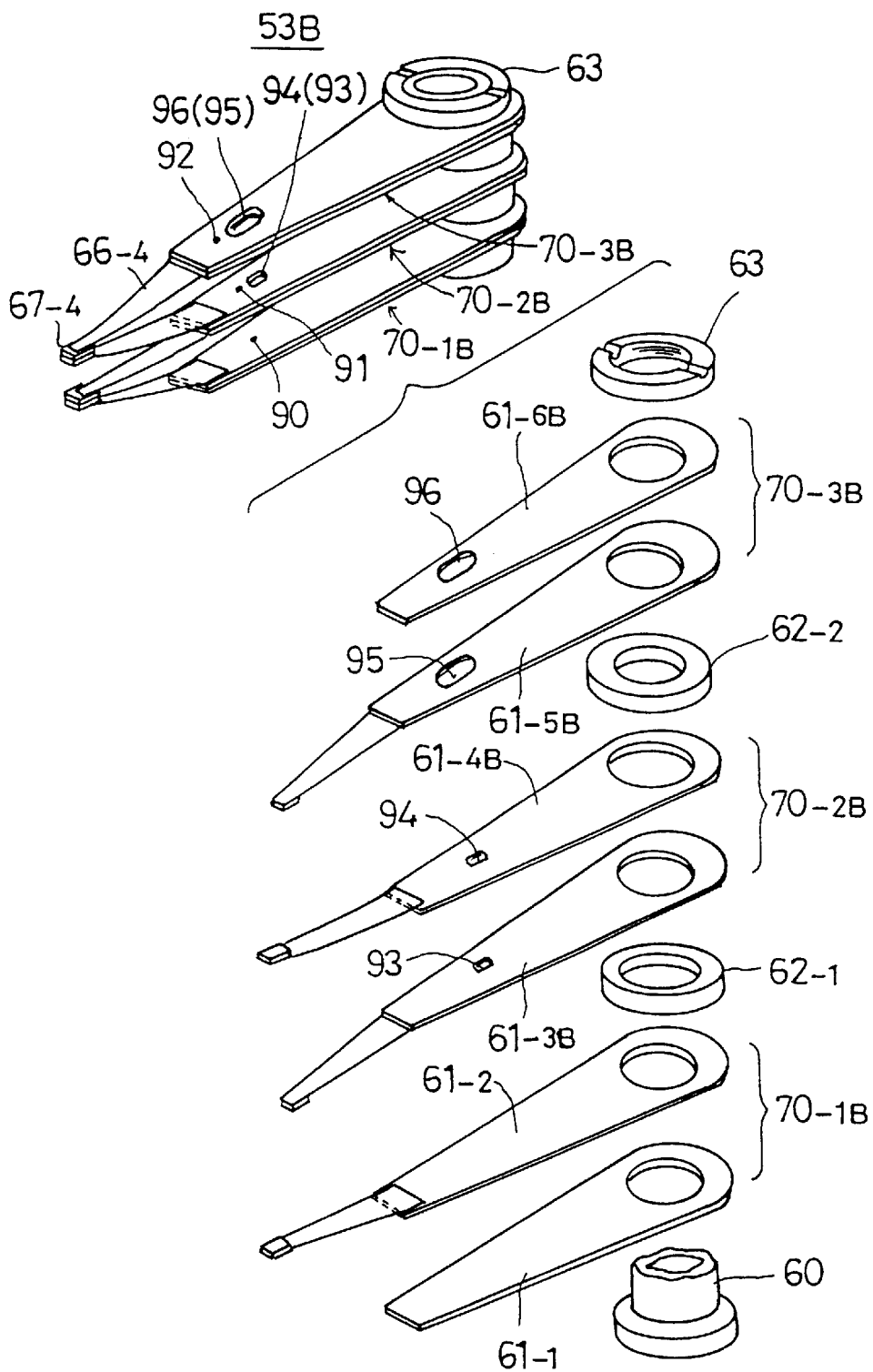
FIG. 10 shows a head suspension unit in a third embodiment of the present invention.

FIG. 10 shows a head suspension unit 53B in a third embodiment of the present invention. The head suspension unit 53B is the same as the head suspension unit 53 shown in FIG. 6, except for arm modules 70-1B, 70-2B and 70-3B. In the head suspension unit 53B, it is possible to perform laser-beam spot welding of the extending-end portions of the arms after the screw member 63 is driven so that the base portions of the arms are fixed.

In the arm module 70-1B, the arms 61-1, 61-2 are fixed to one another at a laser-beam spot welding portion 90 on the extending-end side thereof. In the arm module 70-2B, the arms 61-3B, 61-4B are fixed to one another at a laser-beam spot welding portion 91 on the extending-end side thereof. In the arm module 70-3B, the arms 61-5B, 61-6B are fixed to one another at a laser-beam spot welding portion 92 on the extending-end side thereof.

The arms 61-3B, 61-4B have first openings 93, 94 at extending-end positions corresponding to one another. The arms 61-5B, 61-6B have second openings 95, 96 at extending-end positions corresponding to one another. The second openings 95, 96 are larger than the first openings 93, 94. When these arms are viewed from the top after the base portions of the arms are fixed and assembled, the second openings 95, 96 include the first openings 93, 94, and extend on the extending-end side of the arms further than the first openings 93, 94.

Figure 11:
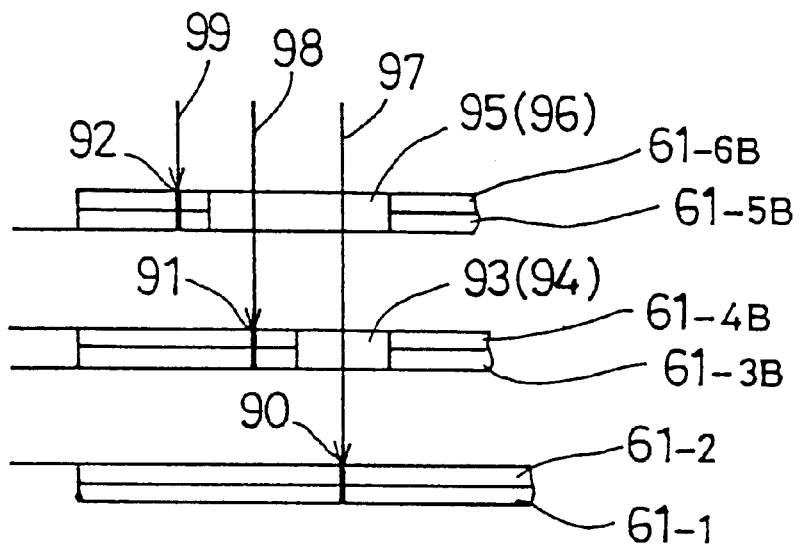
FIG. 11 illustrates laser-beam spot welding of each arm module shown in FIG. 10.

Laser-beam spot welding is performed, three times, as shown in FIG. 11, after the screw member 63 is driven and thus the base portions of all the arms are fixed. Laser-beam spot welding at the laser-beam spot welding portion 90 is performed as a result of a laser beam being applied to the arm 61-2 through the second openings 95, 96 and the first openings 93, 94, as indicated by the arrow 97. Laser-beam spot welding at the laser-beam spot welding portion 91 is performed as a result of the position of the head suspension unit 53B being shifted and a laser beam being applied to the arm 61-4B through the second openings 95, 96, as indicated by the arrow 98. Laser-beam spot welding at the laser-beam spot welding portion 92 is performed as a result of the position of the head suspension unit 53B being further shifted and a laser beam being applied to the arm 61-6B, as indicated by the arrow 99.

Thus, because the laser-spot welding is performed after the screw member 63 is driven and thus the base portions of all the arms are fixed, no unnecessary stress is applied to the laser-beam spot welding portions 90, 91 and 92. As a result, the positioning accuracies of the head sliders are not degraded. Further, the head suspension unit 53B is assembled with high work efficiency.

In each of fourth, fifth, and sixth embodiments of the present invention, extending-end portions of each pair of the arms of each arm module are in contact with one another in a condition in which the extending-end portions push one another by spring force.

Figure 12:
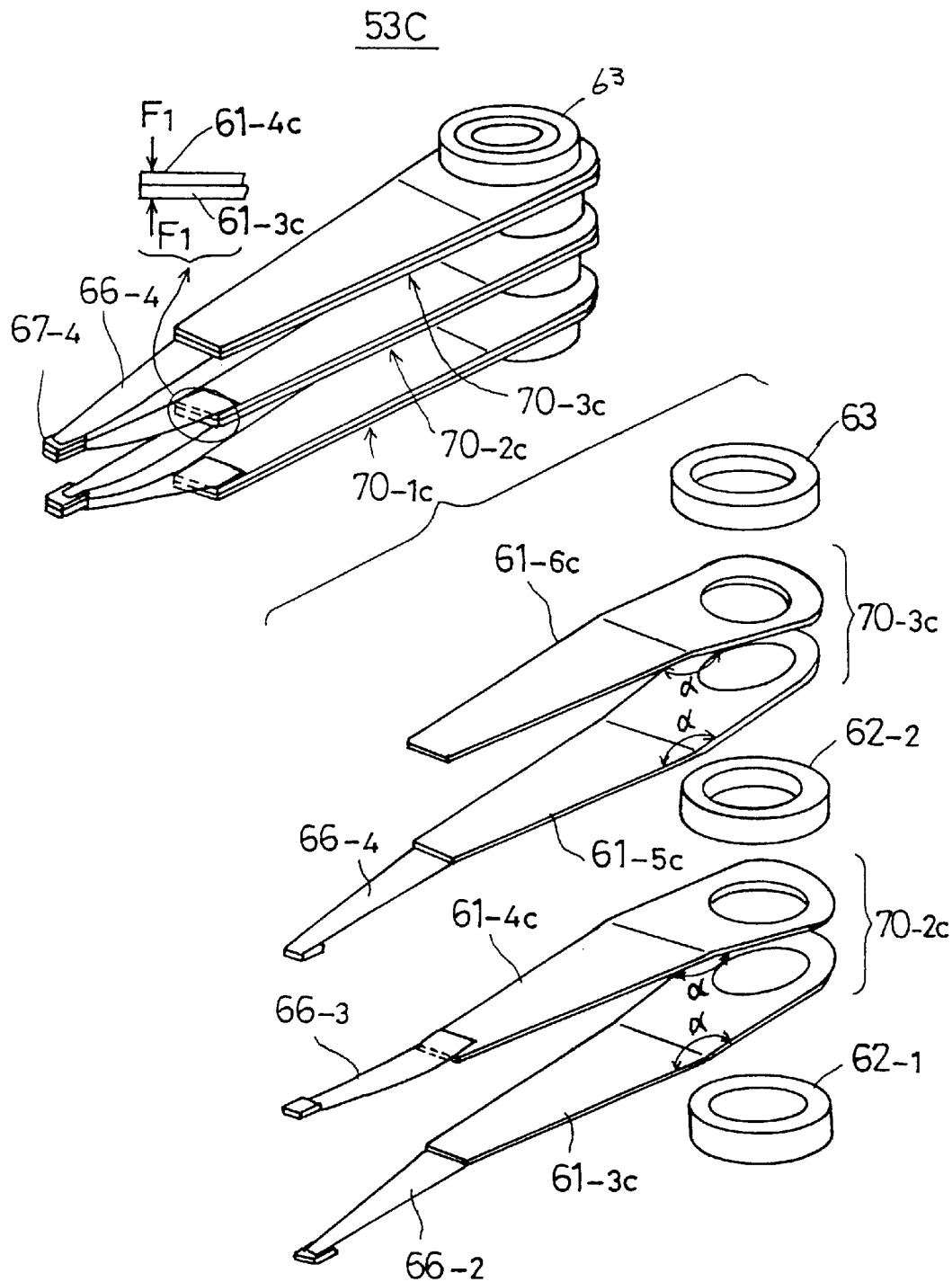
FIG. 12 shows a head suspension unit in a fourth embodiment of the present invention.

FIG. 12 shows a head suspension unit 53C in the fourth embodiment of the present invention. In the head suspension unit 53C, each arm is bent angularly, and each pair of arms are caused to lie on top of one another so that the angularly bent portion of the top arm projects upward and the angularly bent portion of the bottom arm projects downward. Then, the screw member 63 is driven so that the base portions of each pair of arms are fixed, and, thereby, each arm is elastically deformed so as to be flat. As a result, the extending-end portions of the top arm and the bottom arm of each pair of arms push one another by an elastic force F1 which develops in the arms themselves.

When the arm module 70-2C is considered, each of the arms 61-3C and 61-4C is bent angularly to an angle α near to 180 degrees. The arms 61-3C, 61-4C are combined so that the angularly bent portion of the arm 61-3C projects downward and the angularly bent portion of the arm 61-4C projects upward. Then, the screw member 63 is driven so that the base portions of the arms 61-3C and 61-4C are compressed and fixed. Thereby, the arms 61-3C and 61-4C are forcibly caused to be elastically deformed so as to be flat. As a result, the extending-end portions of the arms 61-3C and 61-4C push one another by the elastic force F1 which develops in the arms 61-3C, 64-4C themselves. The elastic force F1 is hundreds of grams.

In the arm module 70-2C, the extending-end portions of the arms 61-3C, 61-4C are quasi-coupled with one another. Therefore, without performing adhesion using adhesive, the arm module 70-2C has advantages similar to those of the arm module in which the extending-end portions of the arms are caused to adhere by using adhesive.

Further, the extending-end portions of the arms 61-3C, 61-4C, which push one another, rub against one another when moving relatively, and a damping effect is exhibited thereby such that the amplitude of the peak of vibration is decreased.

Each of the other arm modules 70-1C and 70-3C has an arrangement the same as that of the above-described arm module 70-2C.

Figure 13:
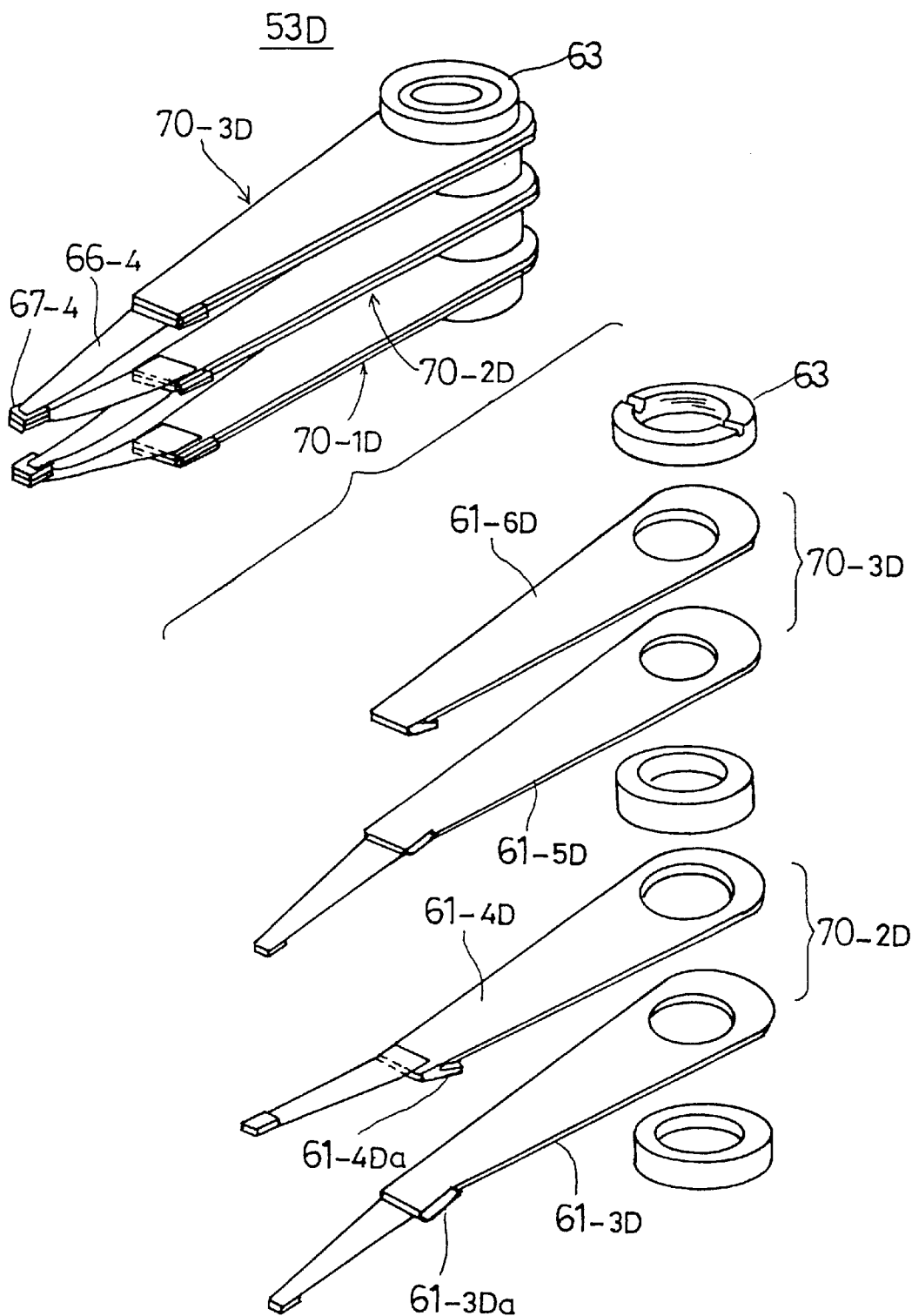
FIG. 13 shows a head suspension unit in a fifth embodiment of the present invention.

FIG. 13 shows a head suspension unit 53D in the fifth embodiment of the present invention. The head suspension unit 53D is a variant embodiment of the above-described head suspension unit 53C in the fourth embodiment. Each arm has a spring piece at one side of the extending-end portion thereof, and each pair of arms are caused to lie on top of one another so that the spring pieces of the respective arms come into contact with one another. Then, the screw member 63 is driven so that the base portions of the arms 61-3C and 61-4C are compressed and fixed. Thereby, the spring pieces, which come into contact with one another, are elastically deformed so as to push one another.

Figure 14A:
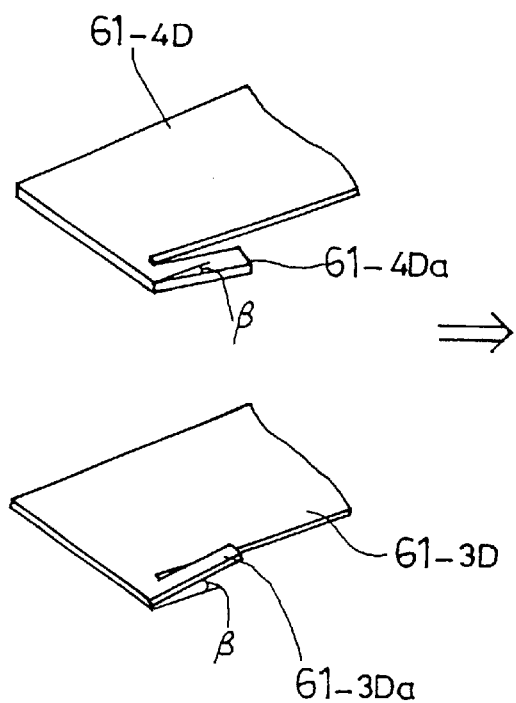
FIGS. 14A and 14B show magnified views of an extending-end portion of an arm module shown in FIG. 13.
Figure 14B:
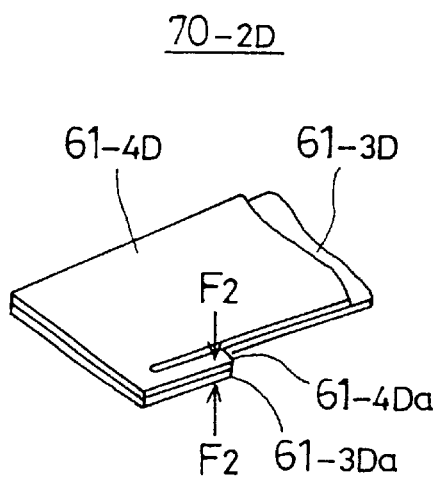

With also reference to FIGS. 14A, 14B, when the arm module 70-2D is considered, the arm 61-3D has the spring piece 61-3D$a$ which inclines upward at a the small angle β at the side of the extending-end portion thereof, and the arm 61-4D has the spring piece 61-4D$a$ which inclines downward at the small angle β at the side of the extending-end portion thereof. The arms 61-3D and 61-4D are caused to lie on top of one another so that the spring pieces 61-3D$a$, 60-4D$a$ face one another. Then the screw member 63 is driven so that the base portions of the arms 61-3D and 61-4D are compressed and fixed. Thereby, the spring pieces 61-3D$a$, 61-4D$a$ are forcibly caused to be elastically deformed so as to be parallel to the arms 61-3D, 61-4D. As a result, the spring pieces 61-3D$a$, 61-4D$a$ push one another by the elastic force F2 which develops in these spring pieces themselves.

In the arm module 70-2D, the spring pieces 61-3D$a$ and 61-4D$a$ of the extending-end portions of the arms 61-3C, 61-4C are quasi-coupled with one another. Therefore, without performing adhesion using adhesive, the arm module 70-2D has advantages similar to those of the arm module in which the extending-end portions of the arms are caused to adhere by using adhesive.

Further, the spring pieces 61-3D$a$, 61-4D$a$ of the extending-end portions of the arm 61-3C, 61-4C, which spring pieces push one another, rub against one another when moving relatively, and a damping effect is exhibited thereby such that the amplitude of the peak of vibration is decreased.

Further, in this arrangement, in comparison to the above-described arm module 70-2C, the position accuracy, in the vertical direction (the direction in which the arm modules line up), of the extending end of the arm module 70-2D is high. This is because each of the arms 61-3D and 61-4D is not bent angularly, but is flat. As the 2.5-inch-size magnetic disk drive has become thinner, the space between the top and bottom magnetic disks is narrow. As a result of the position accuracy, in the vertical direction (the direction in which the arm modules line up), of the extending end of the arm module 70-2D being high, it is easy to assemble the thin magnetic disk drive.

Each of the other arm modules 70-1D and 70-3D has an arrangement the same as that of the above-described arm module 70-2D.

Figure 15:
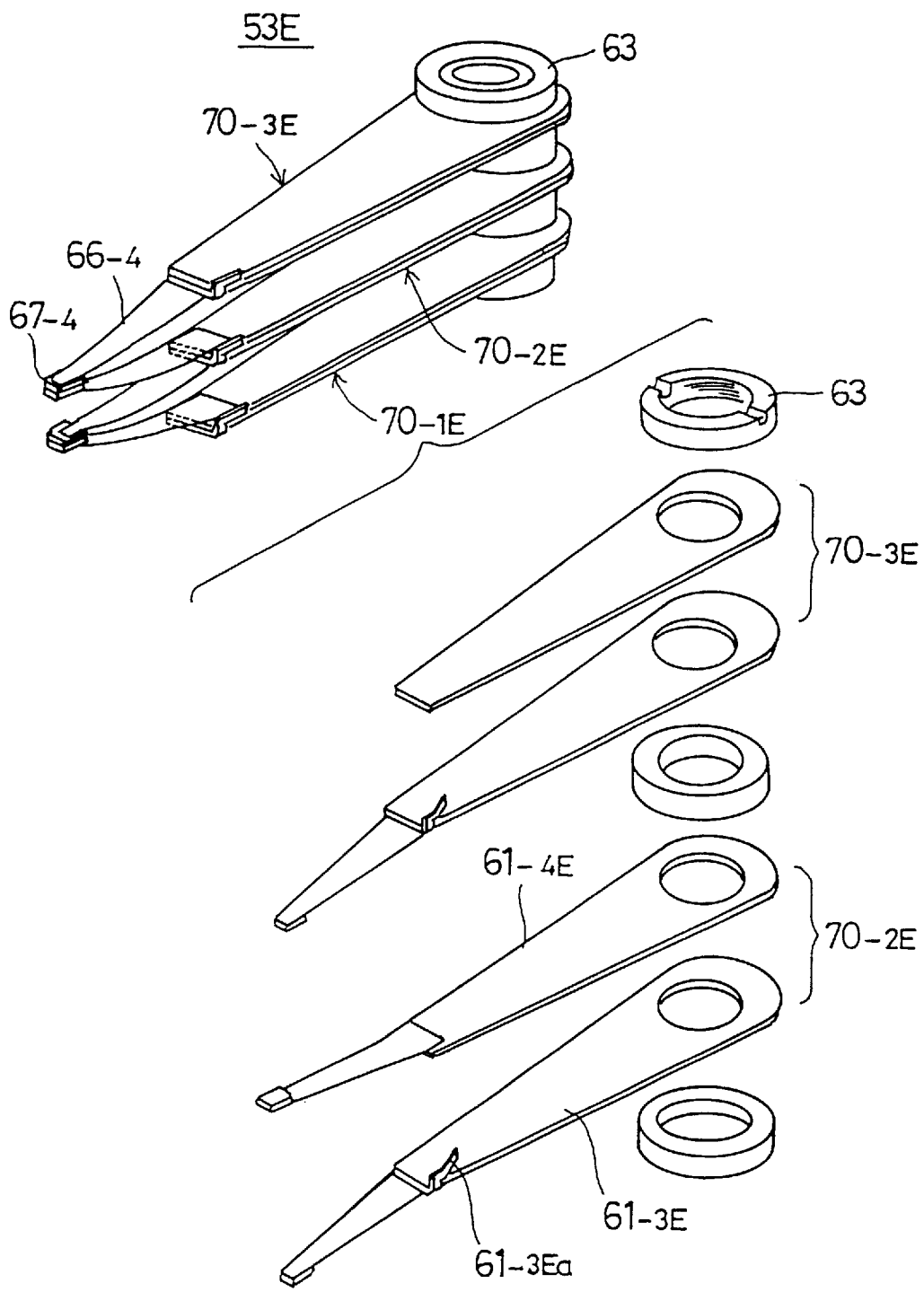
FIG. 15 shows a head suspension unit in a sixth embodiment of the present invention.

FIG. 15 shows a head suspension unit in the sixth embodiment of the present invention. The sixth embodiment is a variant embodiment of the above-described fifth embodiment. The lower arm of each pair of arms of each arm module has a spring piece at a side of the extending-end portion thereof, which spring piece is bent in a direction parallel to the surfaces of the magnetic disks, so that the side end surface of the upper arm of each pair of arms and the spring piece of the lower arm of each pair of arms push one another. Then, in this condition, the screw member 63 is driven and the base portions of each pair of the arms are fixed. Thus, the side end surface of the upper arm of each pair of arms and the spring piece of the lower arm of each pair of arms push one another in the direction parallel to the data recording surfaces of the magnetic disks.

Figure 16A:
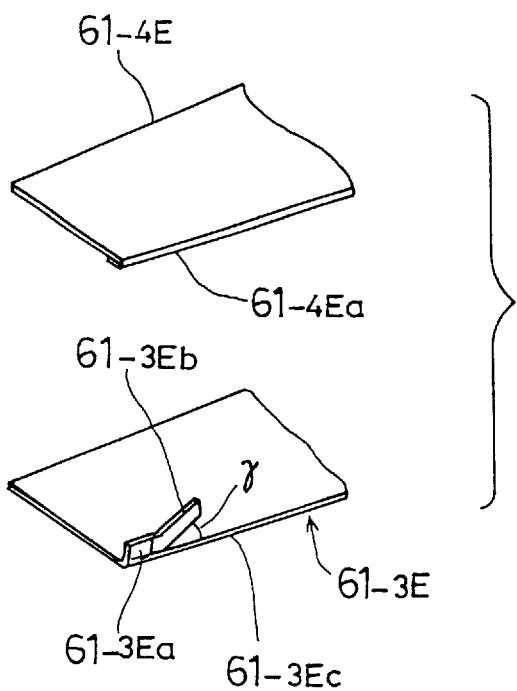
FIGS. 16A, 16B and 16C show magnified views of an extending-end portion of an arm module shown in FIG. 15.
Figure 16B:
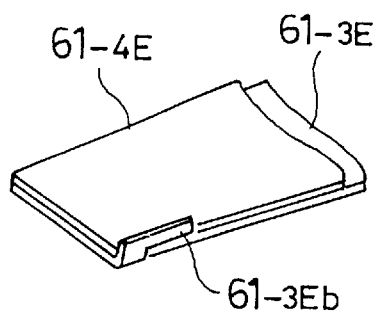
Figure 16C:
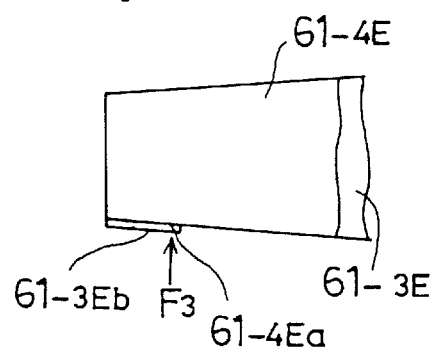

With reference also to FIGS. 16A, 16B and 16C, when the arm module 70-2E is considered, an upward-bent piece 61-3Ea, which is bent upward at the side of an extending-end portion of the lower arm 61-3E, is formed. Further, from the upward bent-piece 61-3Ea, a spring piece 61-3Eb, which extends in the direction toward the base portion of the arm 61-3E and also toward the center of the arm 61-3E, is formed. The spring piece 61-3Eb extends at the angle γ with respect to the side edge 61-3Ec of the arm 61-3E.

The base portions of the upper arm 61-4E and the lower arm 61-3E are fixed as a result of the screw member 63 being driven in a condition in which the side edge 61-4Ea of the upper arm 61-4E pushes the spring piece 61-3Eb of the lower arm 61-3E so as to causes the spring piece 61-3Eb to be deformed elastically, as shown in FIGS. 16B and 16C. By the elastic force F3 which develops in the spring piece 61-3Eb itself, the spring piece 61-3Eb pushes the side edge 61-4Ea of the upper arm 61-4E. Thus, the spring piece 61-3Eb of the lower arm 61-3E and the side edge 61-4Ea of the upper arm 61-4E push one another in the directions parallel to the data recording surfaces of the magnetic disks.

In the arm module 70-2E, at the extending end portions of the arms 61-3E and 61-4E, the spring piece 61-3Eb and side edge 61-4Ea of the arms 61-3E and 61-4E are quasi-coupled with one another. Therefore, without performing adhesion using adhesive, the arm module 70-2E has advantages similar to those of the arm module in which the extending-end portions of the arms are caused to adhere by using adhesive.

Further, the spring piece 61-3Eb and the side edge 61-4Ea of the extending-end portions of the arms 61-3E and 61-4E, which spring piece and side edge push one another, rub against one another when moving relatively, and a damping effect is exhibited thereby such that the amplitude of the peak of vibration is decreased.

Further, in this arrangement, in comparison to the above-described arm module 70-2D, the position accuracy, in the vertical directions (the directions in which the arm modules line up), of the extending end of the arm module 70-2E is higher. This is because each of the arms 61-3E and 61-4E is not bent angularly, but is flat, and, further, the directions in which the side edge 61-4Ea of the upper arm 61-4E and the spring piece 61-3Eb of the lower arm 61-3E push one another are not the directions perpendicular to the data recording surfaces of the magnetic disks, but the directions parallel to the data recording surfaces of the magnetic disks.

Each of the other arm modules 70-1E and 70-3E has an arrangement the same as that of the above-described arm module 70-2E.

In each of seventh, eighth, ninth and tenth embodiments of the present invention, welding is performed from a side of each pair of arms. In each of the seventh and eighth embodiments, laser-beam spot welding for integrating the upper and lower arms of each pair of arms is performed from a side of the arms. In each of the ninth and tenth embodiments, fillet welding for integrating the upper and lower arms of each pair of arms is performed from a side of the arms.

Figure 17:
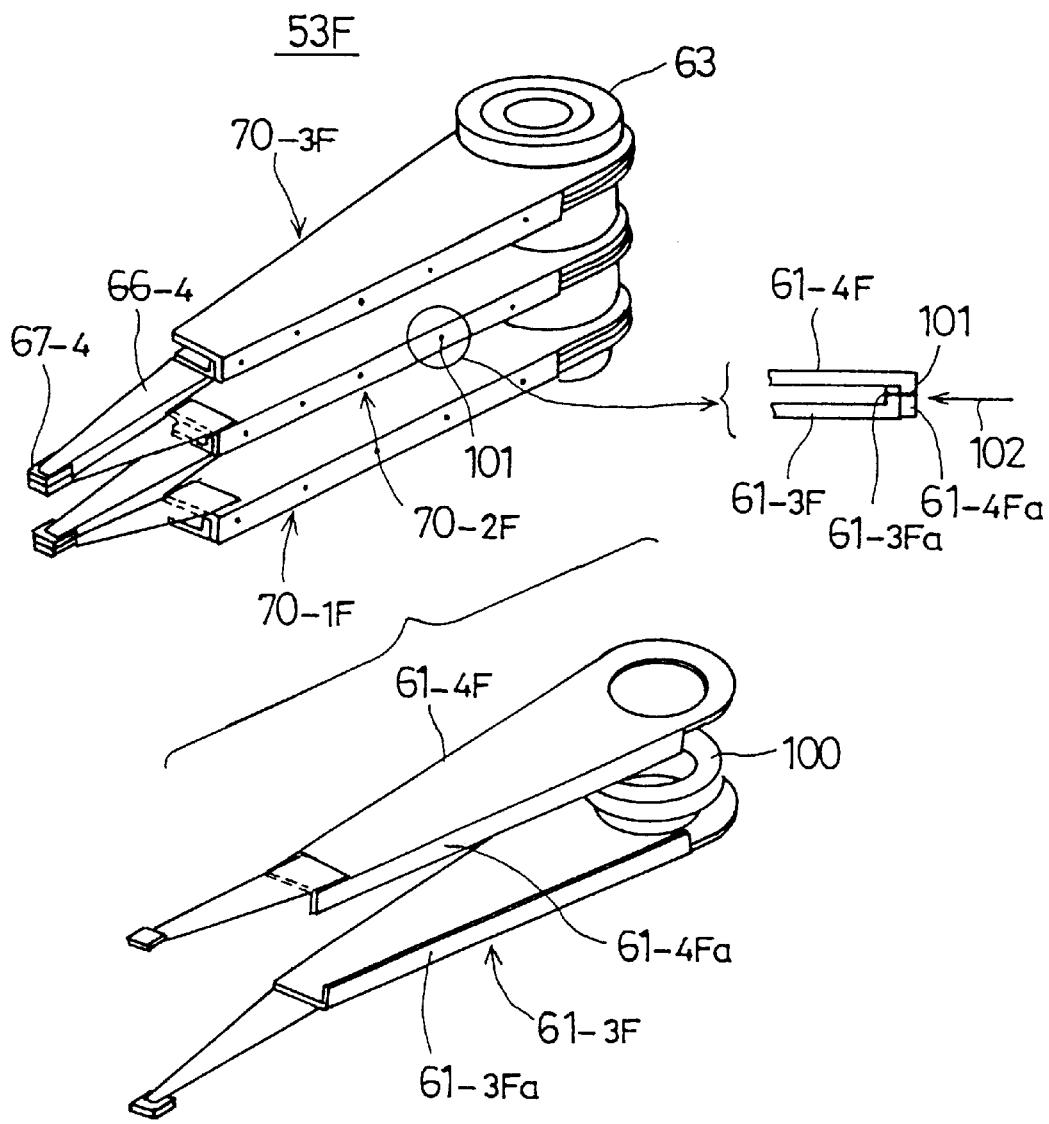
FIG. 17 shows a head suspension unit in a seventh embodiment of the present invention.

FIG. 17 shows a head suspension unit 53F in the seventh embodiment of the present invention. When an arm module 70-2F is considered, a lower arm 61-3F has a rib 61-3Fa, through approximately the entire length thereof, at one side edge thereof, which rib is bent upward. An upper arm 61-4F has a rib 61-4Fa, through approximately the entire length thereof, at one side edge thereof, which rib is bent downward.

A spacer 100 is sandwiched by base portions of the upper and lower arms 61-4F and 61-3F. The upper and lower arms 61-4F and 61-3F are combined with one another in a condition in which the ribs 61-3Fa and 61-4Fa thereof are in contact with one another, where the rib 61-3Fa is positioned inside and the rib 61-4Fa is positioned outside. The ribs 61-3Fa and 61-4Fa which are in contact with one another are fixed to one another through laser-beam spot welding at the portions 101.

Figure 1A:
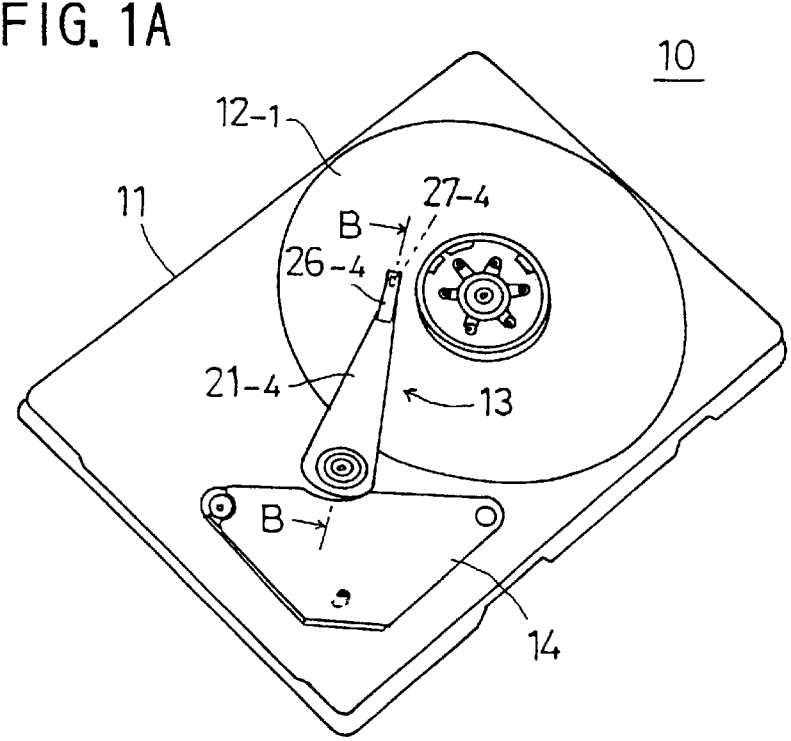
FIGS. 1A and 1B show a magnetic disk drive in the related art.
Figure 1B:
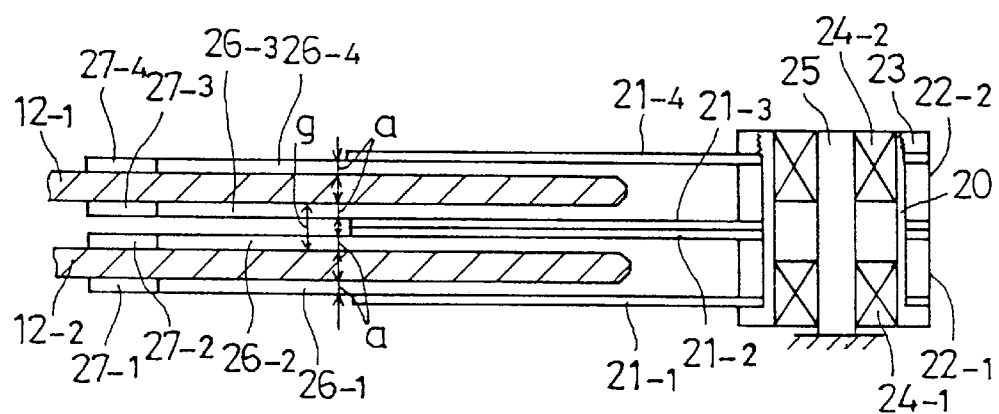
Figure 2:
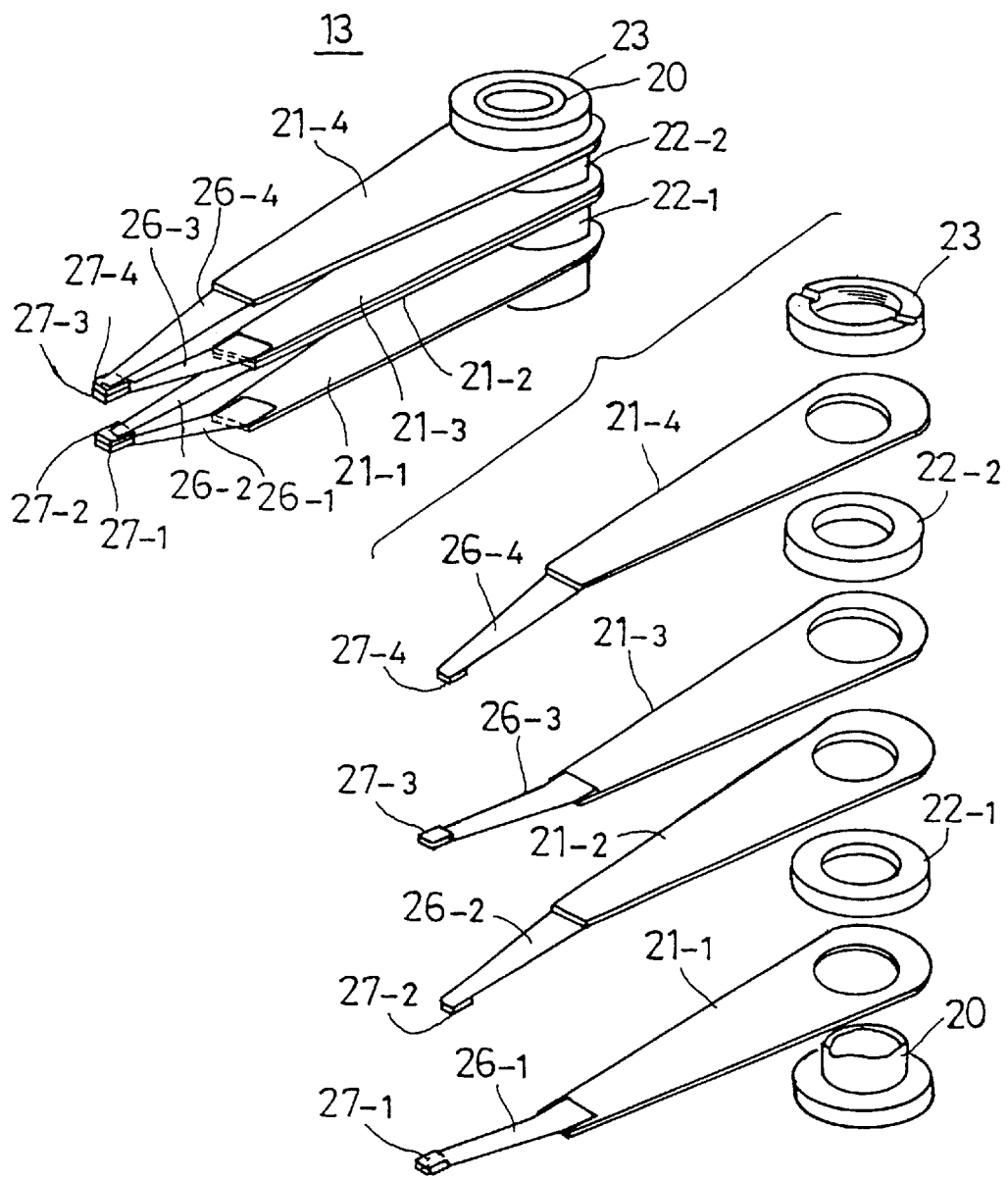
FIG. 2 shows a head suspension unit shown in FIGS. 1A and 1B.
Figure 3A:
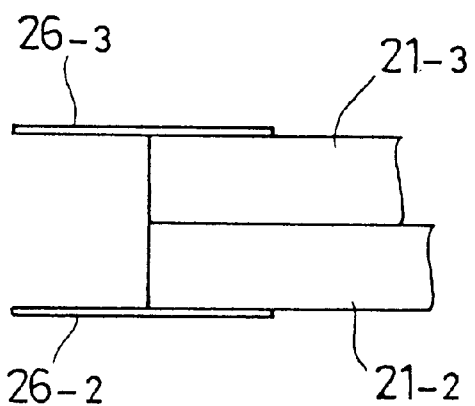
FIGS. 3A and 3B show how extending-end portions of arms lie on top of one another.
Figure 3B:
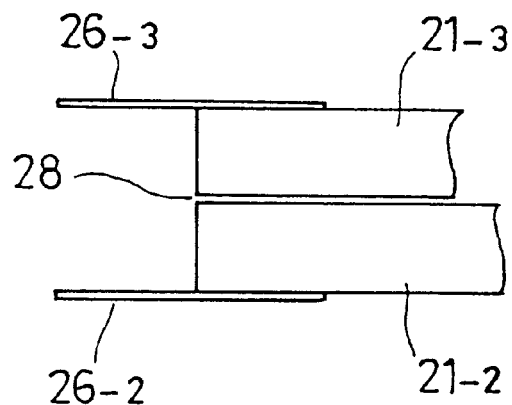

Because the respective arms 61-3F, 61-4F of the arm module 70-2F have the ribs 61-3Fa, 61-4Fa, the arm module 70-2F has higher rigidity, in comparison to the arm modules 70-2, 70-2A, shown in FIGS. 2 and 5, and so forth, in which the arms having no ribs lie on top of one another.

Further, because laser-beam spot welding can be performed from the side of each pair of arms, after the arms 61-3F, 61-4F are caused to lie on top of one another, and the base portions of all the arms are fixed as a result of the screw member 63 being driven, the laser beam 102 is applied from the side of the arms, and, thus, laser-beam spot welding is performed. As a result, no unnecessary stress is applied to the portions 101 at which the laser-beam spot welding was performed. As a result, the positioning accuracies of the head sliders are not degraded. Further, the head suspension unit 53F is assembled with high work efficiency.

Each of the other arm modules 70-1F and 70-3F has an arrangement the same as that of the above-described arm module 70-2F.

Figure 18:
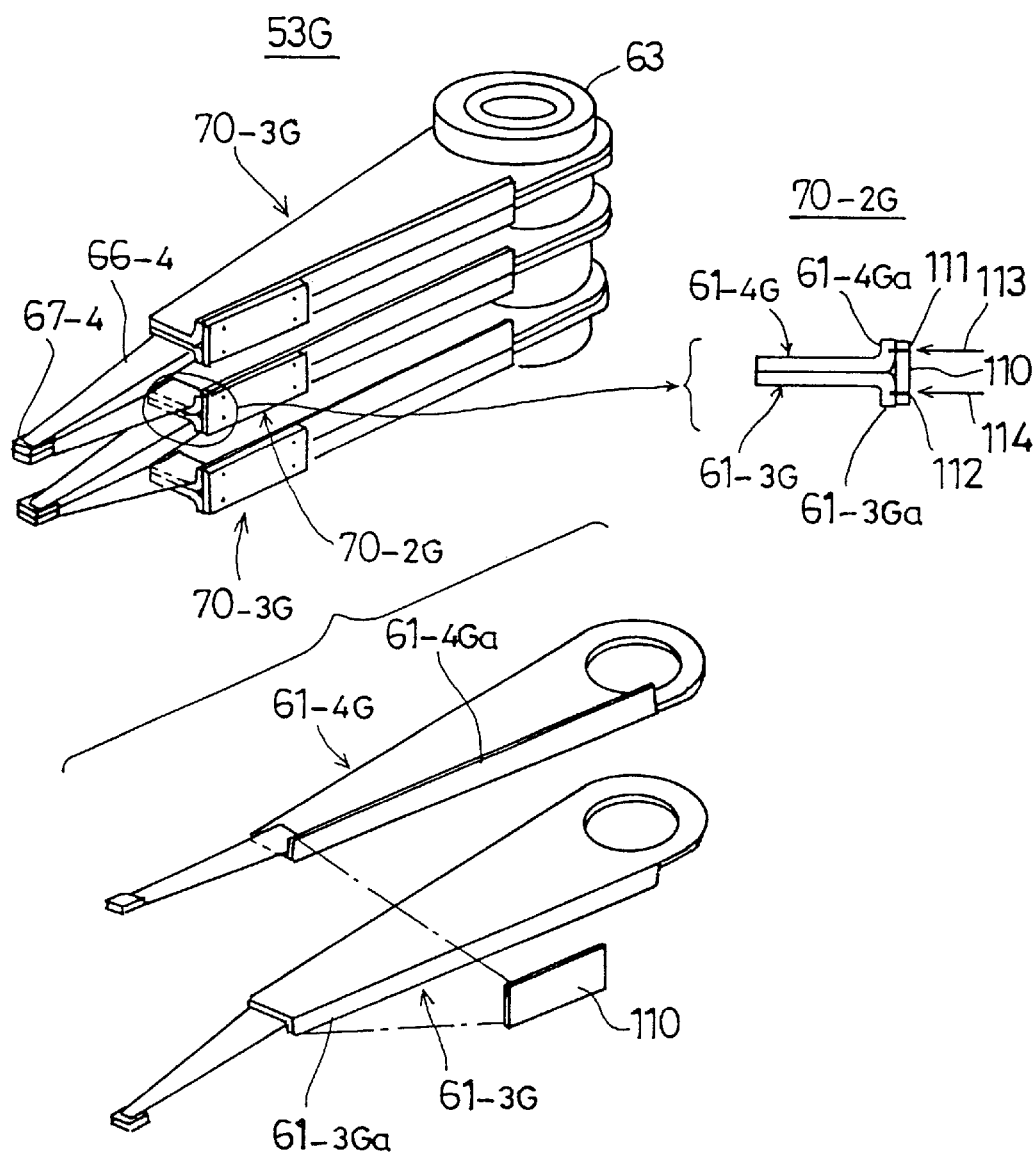
FIG. 18 shows a head suspension unit in an eighth embodiment of the present invention.

FIG. 18 shows a head suspension unit 53G in the eighth embodiment of the present invention. When an arm module 70-2G is considered, a lower arm 61-3G has a rib 61-3Ga, through approximately the entire length thereof, at one side edge thereof, which rib is bent downward. An upper arm 61-4G has a rib 61-4Ga, through approximately the entire length thereof, at one side edge thereof, which rib is bent upward.

The upper and lower arms 61-4G, 61-3G are caused to lie on top of one another, the ribs 61-4Ga and 61-3Ga line up on a vertical plane, a connection plate 110 is caused to come into contact with extending-end portions of the outer surfaces of the ribs 61-4Ga, 61-3Ga, and laser-beam spot welding is performed on the ribs 61-4Ga, 61-3Ga and the connection plate 110 at the portions 111, 112 so that the ribs 61-4Ga, 61-3Ga are fixed to one another via the connection plate 110. Thus, the arms 61-4G and 61-3G are fixed to one another at extending-end portions thereof.

Because the respective arms 61-3G, 61-4G of the arm module 70-2G have the ribs 61-3Ga, 61-4Ga, the arm module 70-2G has higher rigidity, in comparison to the arm modules 70-2, 70-2A, shown in FIGS. 2 and 5, and so forth, in which the arms having no ribs lie on top of one another.

Further, because laser-beam spot welding can be performed from the side of each pair of arms, the laser beams indicated by the arrows 113, 114 are applied from the side of the arms, and, thus, laser-beam spot welding is performed, after the arms 61-3G, 61-4G are caused to lie on top of one another, and after the base portions of all the arms are fixed as a result of the screw member 63 being driven. As a result, no unnecessary stress is applied to the portions 111, 112 at which laser-beam spot welding was performed. As a result, the positioning accuracies of the head sliders are not degraded. Further, the head suspension unit 53G is assembled with high work efficiency.

Further, no space is present between the arms 61-3G, 61-4G which lie on top of one another. As a result, the arm module 70-2G is suitable for reducing the thickness of the magnetic disk drive.

Each of the other arm modules 70-1G and 70-3G has an arrangement the same as that of the above-described arm module 70-2G.

Figure 19:
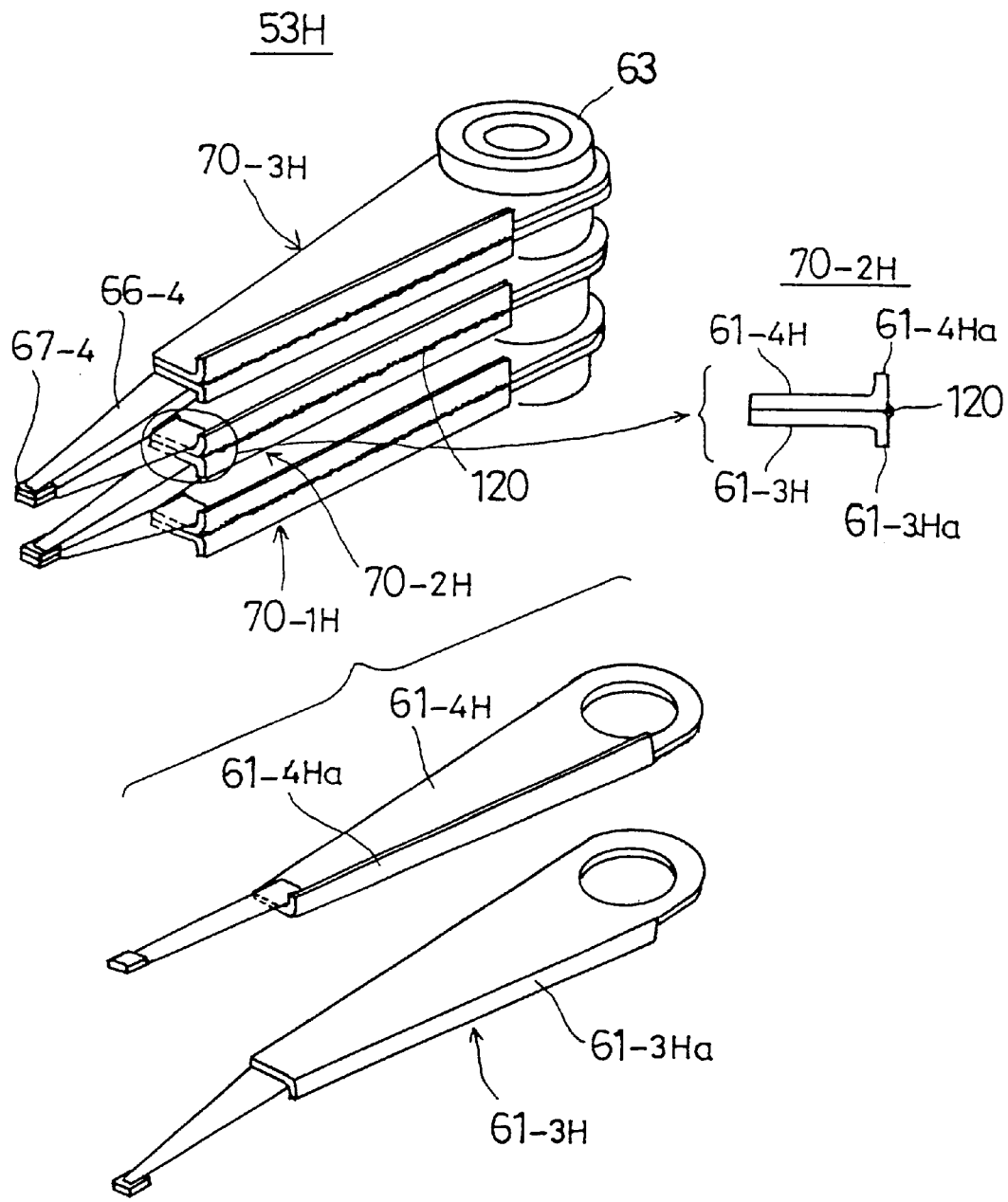
FIG. 19 shows a head suspension unit in a ninth embodiment of the present invention.

FIG. 19 shows a head suspension unit 53H in the ninth embodiment of the present invention. When an arm module 70-2H is considered, a lower arm 61-3H has a rib 61-3H*a*, through approximately the entire length thereof, at one side edge thereof, which rib is bent downward. An upper arm 61-4H has a rib 61-4H*a*, through approximately the entire length thereof, at one side edge thereof, which rib is bent upward. The upper arm 61-4H and the lower arm 61-3H are caused to lie on top of one another, the bent portions of the ribs 61-4H*a* and 61-3H*a* are caused to face one another, and the thus-facing bent portions of the ribs 61-4H*a* and 61-3H*a* are fixed to one another through fillet welding through the entire length thereof at the portion 120.

Because the respective arms 61-3H, 61-4H of the arm module 70-2H have the ribs 61-3H*a*, 61-4H*a*, the arm module 70-2H has higher rigidity, in comparison to the arm modules 70-2, 70-2A, shown in FIGS. 2 and 5, and so forth, in which the arms having no ribs lie on top of one another.

Further, no space is present between the arms 61-3H, 61-4H which lie on top of one another. As a result, the arm module 70-2H is suitable for reducing the thickness of the magnetic disk drive.

Each of the other arm modules 70-1H and 70-3H has an arrangement the same as that of the above-described arm module 70-2H.

Figure 20:
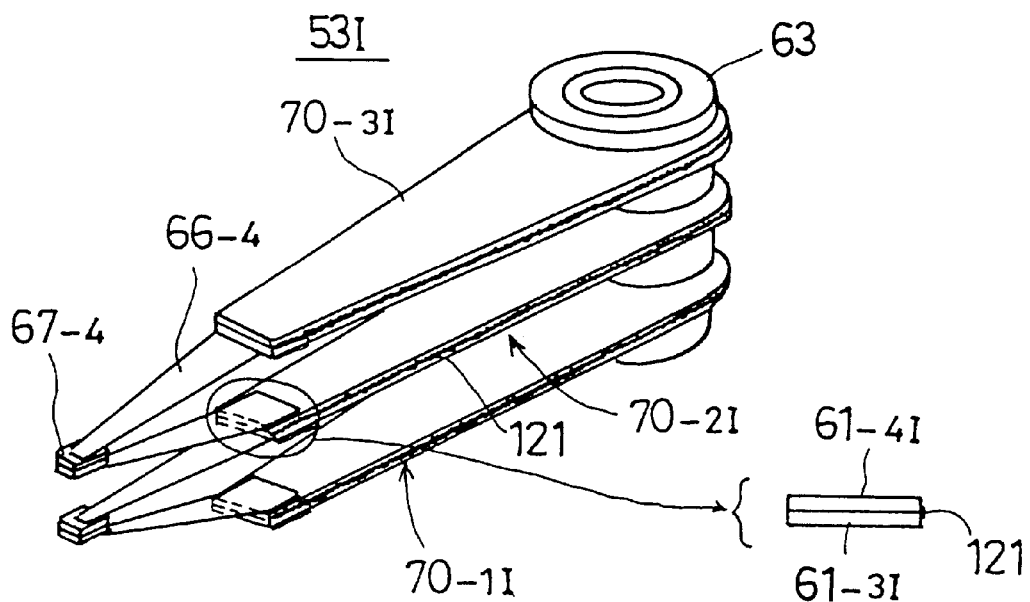
FIG. 20 shows a head suspension unit in a tenth embodiment of the present invention.

FIG. 20 shows a head suspension unit 53I in the tenth embodiment of the present invention. When an arm module 70-2I is considered, an upper arm 61-4I and a lower arm 61-3I are caused to lie on top of one another, and the side faces of the arms 61-4I and 61-3I are fixed to one another through fillet welding performed at the portion 121, through the entire length of the arms 61-4I, 61-3I.

Each of the other arm modules 70-1I and 70-3I has an arrangement the same as that of the above-described arm module 70-2I.

Figure 21:
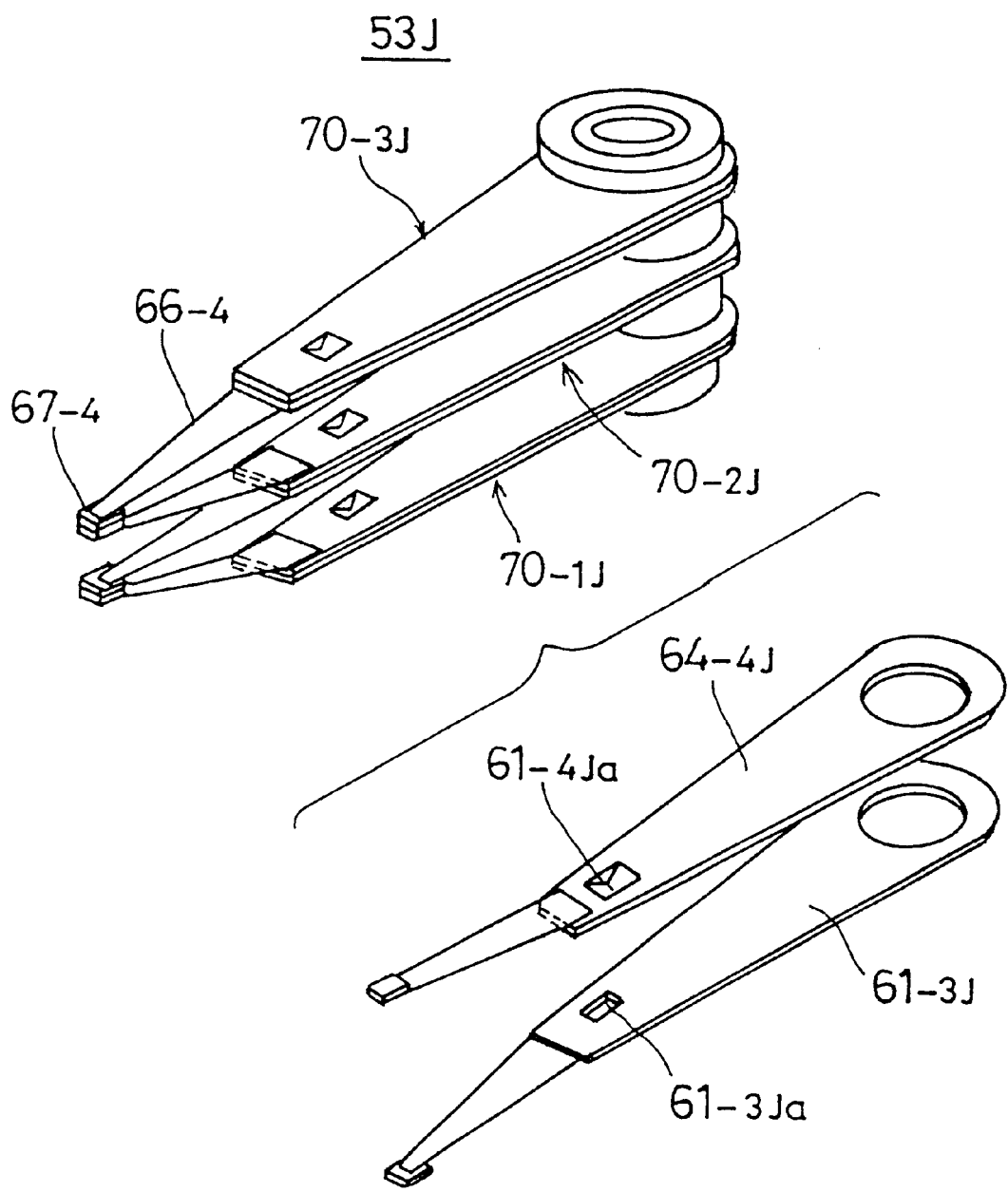
FIG. 21 shows a head suspension unit in an eleventh embodiment of the present invention.
Figure 22A:
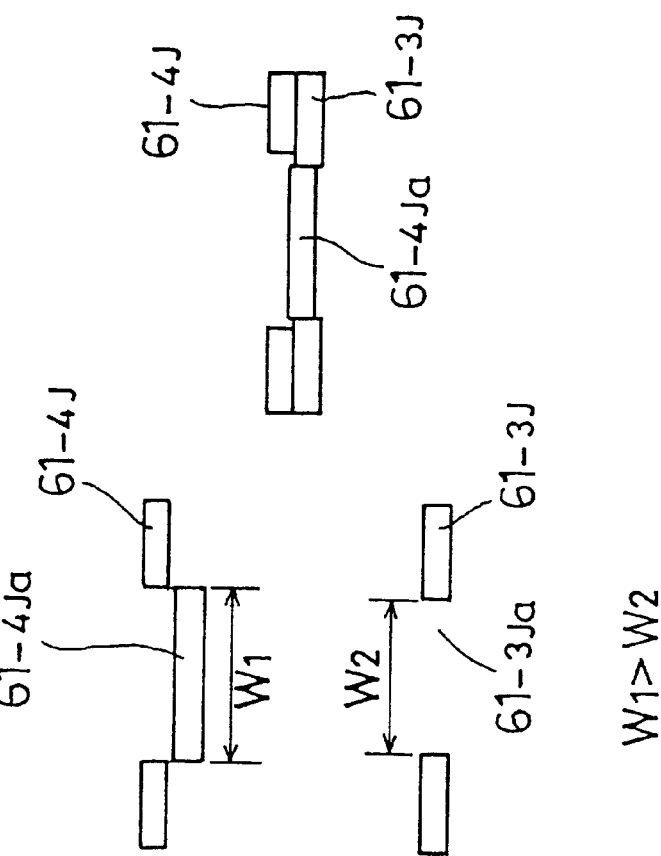
FIGS. 22A, 22B and 22C show magnified views of portions of upper and lower arms, at which portions press-fitting fixing is performed.
Figure 22B:
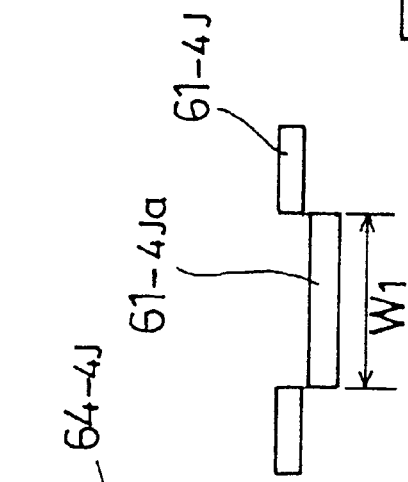

FIG. 21 shows a head suspension unit 53J in an eleventh embodiment of the present invention. When an arm module 70-2J is considered, a lower arm 61-3J has a rectangular opening 61-3J*a* at an extending-end portion thereof, and an upper arm 61-4J has a cut-and-raised portion 61-4J*a* at an extending-end portion thereof, which cut-and-raised portion projects downward. With reference also to FIGS. 22A and 22B, the cut-and-raised portion 61-4J*a* has a width W1 while the opening 61-3J*a* has a width W2. The widths W1 and W2 are such that the width W1 is slightly larger than the width W2, that is, W1>W2.

Figure 22C:
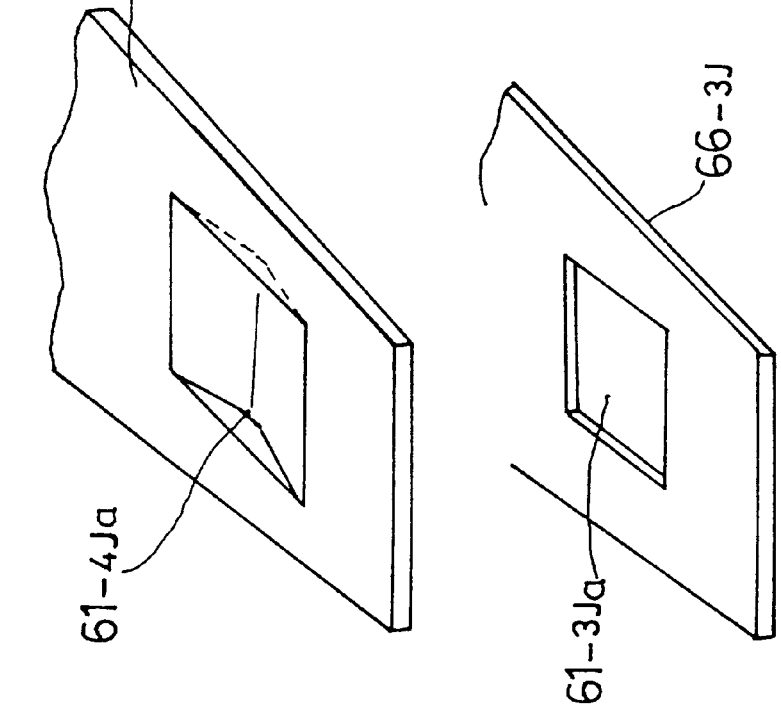

By using a press-fitting-jig, the cut-and-raised portion 61-4J*a* is deformed and press-fitted into the opening 61-3J*a*, as shown in FIG. 22C. Thus, the arms 61-4J and 61-3J are fixed to one another at extending-end portions thereof.

This press-fitting work is performed in a condition in which base portions of the arms 61-4J and 61-3J are roughly combined with one another.

The arm module 70-2J can be easily manufactured in comparison to a case where welding or the like is performed.

Each of the other arm modules 70-1J and 70-3J has an arrangement the same as that of the above-described arm module 70-2J.

Figure 23:
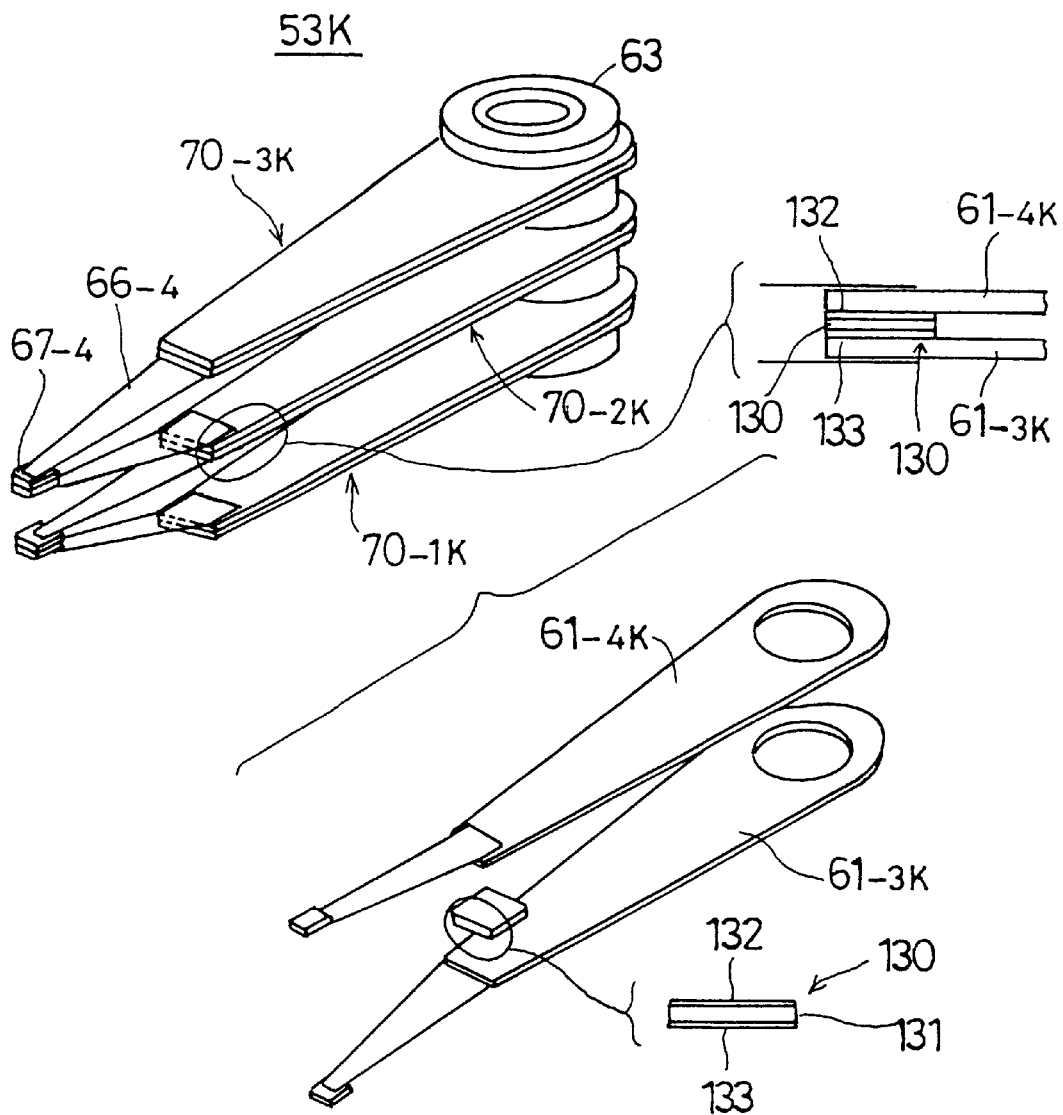
FIG. 23 shows a head suspension unit in a twelfth embodiment of the present invention.

FIG. 23 shows a head suspension unit 53K in a twelfth embodiment of the present invention. The head suspension unit 53K is a variant embodiment of the head suspension unit 53 shown in FIGS. 5A, 5B and 6. When an arm module 70-2K is considered, extending-end portions of lower and upper arms 61-3K and 61-4K are caused to adhere by using a piece 130 of an adhesive-double-coated tape (double-sided tape).

The piece 130 of the adhesive-double-coated tape has an arrangement in which adhesive layers 132, 133 are provided on the top surface and the bottom surface of a sheet 131 made of synthetic resin.

In a case where arms are caused to adhere as a result of adhesive being coated, work of coating the adhesive is needed. Also, the amount of the coated adhesive may vary, and, as a result, the characteristics of the thus-manufactured arm module may vary among particular products. In contrast to this, in the case where the piece 130 of the adhesive-double-coated tape is used for causing the arms to adhere, the portions at which the arms 61-3K, 61-4K are caused to adhere can be made uniform, as a result of the size of the piece 130 of the adhesive-double-coated tape being controlled. As a result, it is possible to manufacture the arm module with little variation in the characteristics thereof. Also, the arm module can be easily manufactured.

Further, the sheet 131 and the adhesive layers 132, 133 exhibit a viscous damping effect. As a result, it is possible to reduce the amplitude of the peak of vibration of the arm module 70-2K when resonance occurs. As a result, the head sliders are positioned with high accuracy.

Each of the other arm modules 70-1K and 70-3K has an arrangement the same as that of the above-described arm module 70-2K.

Figure 24:
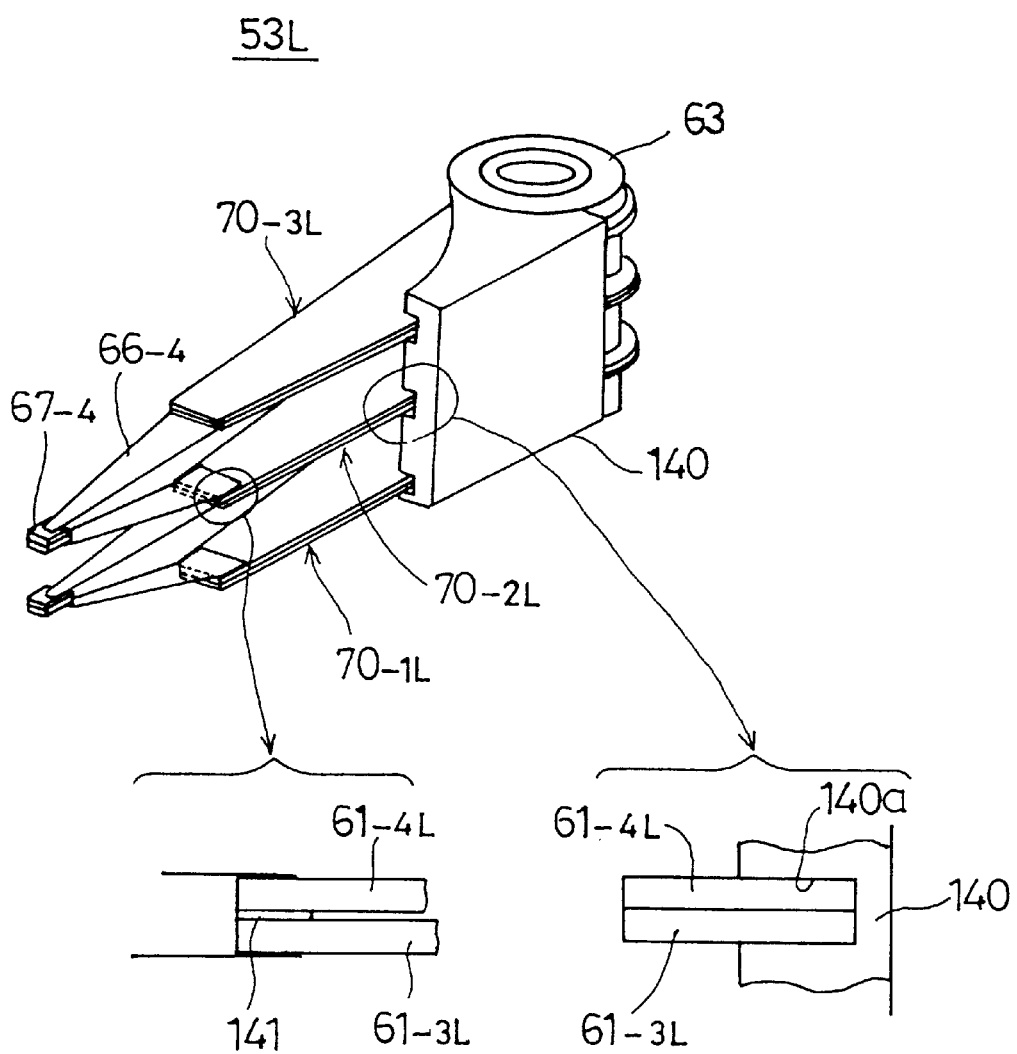
FIG. 24 shows a head suspension unit in a thirteenth embodiment of the present invention.

FIG. 24 shows a head suspension unit 53L in a thirteenth embodiment of the present invention. The head suspension unit 53L includes an arm-clamping member 140 on a base-portion side. The arm-clamping member 140 is made of aluminum, has a comb-tooth shape, and has recess portions 140*a*, each of which recess portions has a size such that two arms which lie on top of one another are press-fitted into the recess portion 140*a*.

When an arm module 70-2L is considered, extending-end portions of upper and lower arms 61-4L, 61-3L are caused to adhere by using adhesive 141. Base portions of these arms 61-4L, 61-3L are compressed as a result of the screw member 63 being driven. Further, portions near to the base portions of these arms are press-fitted into the recess portion 140*a*.

Because the portions near to the base portions of these arms 61-3L, 61-4L are fixed by the arm-clamping member 140, the arm module 70-2L has higher rigidity, in comparison to the arm modules 70-2, 70-2A, shown in FIGS. 2 and 5. As a result, the resonance frequency of the arm module 70-2L is higher, and, also, the amplitude of the peak of vibration when resonance occurs can be reduced. Thereby, the head sliders can be positioned with high accuracy.

Each of the other arm modules 70-1L and 70-3L has an arrangement the same as that of the above-described arm module 70-2L.

Figure 25:
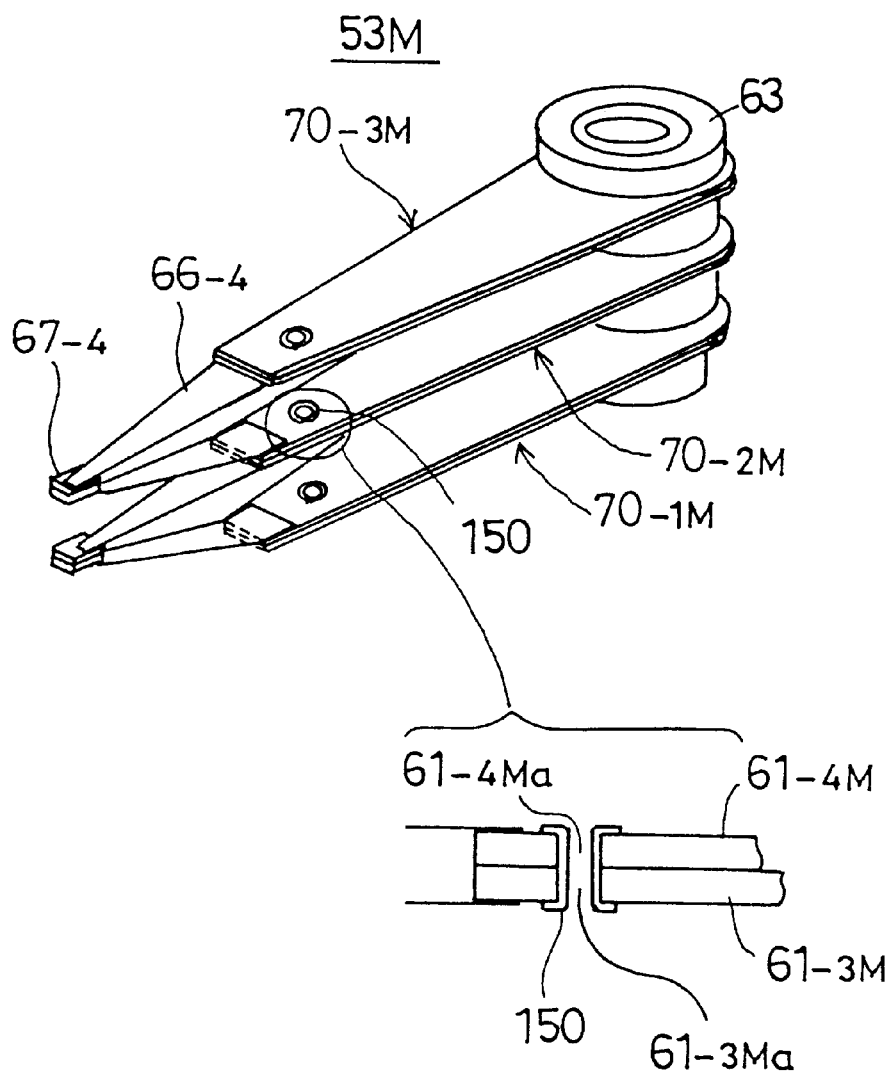
FIG. 25 shows a head suspension unit in a fourteenth embodiment of the present invention.

FIG. 25 shows a head suspension unit 53M in a fourteenth embodiment of the present invention. An arm module 70-2M has an arrangement in which extending-end portions of lower and upper arms 61-3M and 61-4M are fixed to one another as a result of holes 61-3Ma and 61-4Ma being fixed to one another by an eyelet member 150 which is plastically deformed.

Each of the other arm modules 70-1M and 70-3M has an arrangement the same as that of the above-described arm module 70-2M.

Figure 26:
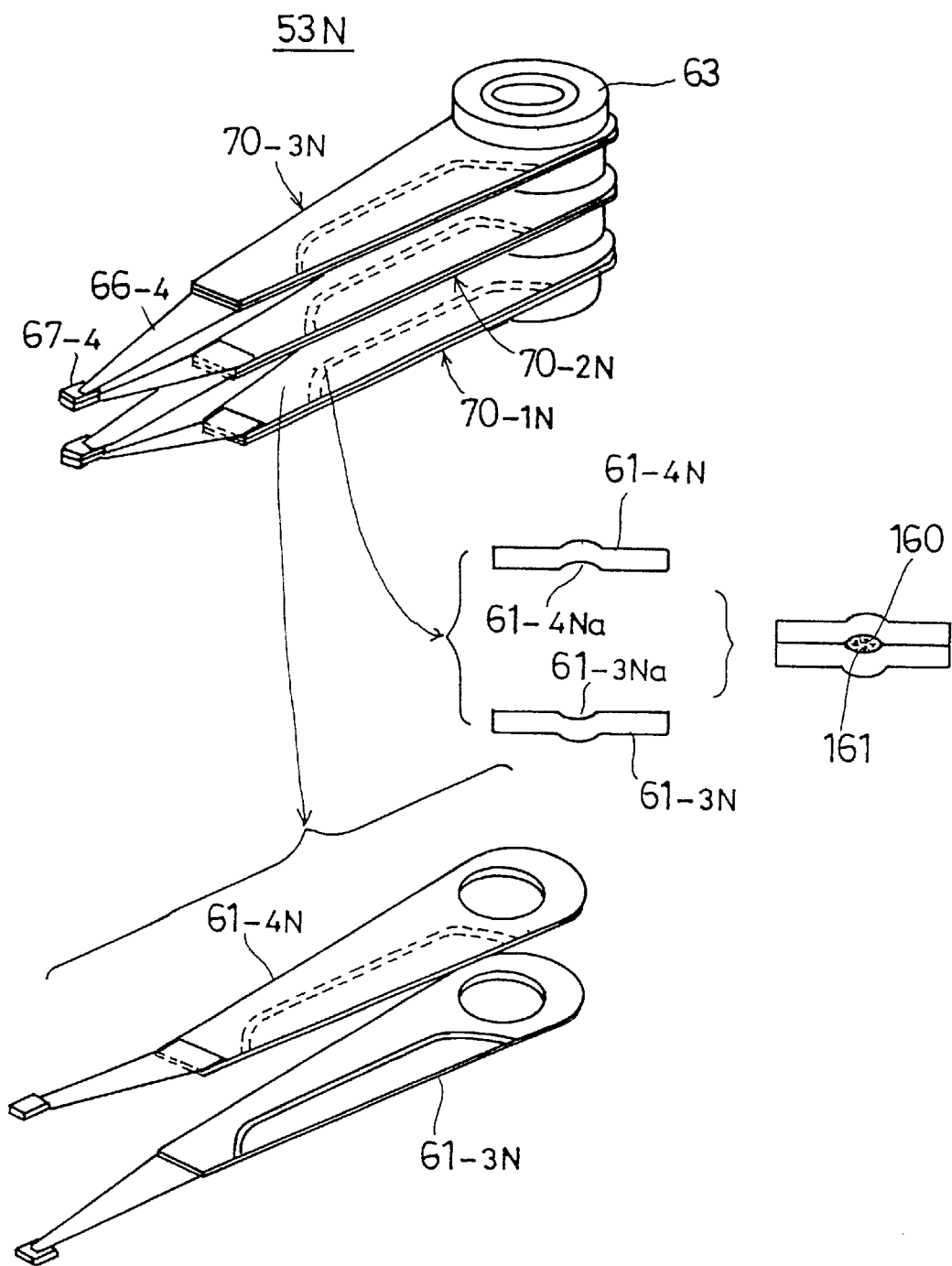
FIG. 26 shows a head suspension unit in a fifteenth embodiment of the present invention.

FIG. 26 shows a head suspension unit 53N in a fifteenth embodiment of the present invention. When an arm module 70-2N is considered, on a surface of a lower arm 61-3N and a surface of an upper arm 61-4N, which surfaces face one another, lead-wire passing grooves 61-3Na and 61-4Na are formed at positions corresponding to one another, respectively. Through the lead-wire passing grooves 61-3Na and 61-4Na, a lead wire is caused to pass. The arms 61-3N and 61-4N lie on top of one another, extending-end portions thereof are caused to adhere, and, thereby, these arms are integrated. As a result, a lead-wire passing path 160 is formed from the lead-wire passing grooves 61-3Na and 61-4Na which face one another. The thus-formed lead-wire passing path 160 extends along the longitudinal direction of the arm module 70-2N. Lead wires 161 connected with the head sliders 67-3, 67-4 are caused to pass through the lead-wire passing path 160. As a result, the lead wires 161 are prevented from being exposed externally so as to come into contact with the magnetic disks or the like.

Each of the other arm modules 70-1N and 70-3N has an arrangement the same as that of the above-described arm module 70-2N.

Further, it is possible that belt-shaped flexible wires are used instead of the lead wires, and are laid on the top surface of each arm module.

The present invention is not limited to the arrangement, as shown in FIG. 5B, in which the size of each magnetic disk is 2.5 inches and the two magnetic disks are incorporated in the magnetic disk drive. The present invention can also be applied to a magnetic disk drive in which three magnetic disks are incorporated, for example.

Further, the present invention is not limited to the arrangement in which each arm module includes the two arms which lie on top of one another. The present invention can also be applied to an arrangement in which each arm module includes three arms which lie on top of each other, or four arms which lie on top of each other, for example.

Further, instead of the magnetic head sliders, head sliders having optical heads loaded thereon, respectively, can also be used. In such a case, optical disks are used instead of the magnetic disks, and a disk drive according to the present invention is an optical disk drive.

Further, the present invention is not limited to the above-described embodiments, and variations and modifications may be made without departing from the scope of the present invention.

The contents of the basic Japanese Patent Application No. 10-028783, filed on Feb. 10, 1998, are hereby incorporated by reference.

What is claimed is:

1. A disk drive comprising:
    a disk which is rotated;
    a plurality of arm modules, each of which comprises a plurality of plate-shaped arms which lie on top of each other, said plurality of arm modules lining up vertically, and, except the lowest one, having openings through which a laser beam passes, respectively, the sizes of the openings of each pair of adjacent arm modules of said plurality of arm modules being such that the opening of the upper arm module is larger than the opening of the lower arm module,
    a plurality of head sliders which are supported by the extending end of said arm module and face said disk;
    said arm modules further comprising suspensions supported by said plurality of plate-shaped arms and supporting said head slider; and
    an actuator which drives said arm modules,
    wherein the plurality of arms of each arm module are integrated as a result of extending-end portions thereof being welded together by the laser beam which has passed through the openings of the higher arm modules.

2. The disk drive as claimed in claim 1, wherein said plurality of plate-shaped arms which lie on top of each other comprise two arms and are integrated as a result of a projection formed on one of said two arms being press-fitted into an opening formed in the other of said two arms.

3. The disk drive as claimed in claim 1, wherein said plurality of plate-shaped arms which lie on top of each other are integrated by using an eyelet member.

4. A head suspension unit, used in a disk drive, comprising:
    a plurality of arm modules, each of which comprises a plurality of plate-shaped arms which lie on top of each other, said plurality of arm modules lining up vertically, and, except the lowest one, having openings through which a laser beam passes, respectively, the sizes of the openings of each pair of adjacent arm modules of said plurality of arm modules being such that the opening of the upper arm module is larger than the opening of the lower arm module,
    a plurality of head sliders which are supported by the extending ends of said arm modules;
    said arm modules further comprising suspensions supported by said plurality of plate-shaped arms and supporting said head sliders;
    wherein the plurality of arms of each arm module are integrated as a result of extending-end portions thereof being welded together by the laser beam which has passed through the openings of the higher arm modules.

5. The head suspension unit as claimed in claim 4, wherein said plurality of plate-shaped arms which lie on top of each other comprise two arms and are integrated as a result of a projection formed on one of said two arms being press-fitted into an opening formed in the other of said two arms.

6. The head suspension unit as claimed in claim 4, wherein said plurality of plate-shaped arms which lie on top of each other are integrated by using an eyelet member.

7. A disk drive comprising:
    a disk which is rotated;
    a plurality of arm modules, each of which comprises a plurality of plate-shaped arms which lie on top of each other;
    said plurality of arm modules lining up vertically, and, except the lowest one, having openings through which a laser beam passes, respectively, the sizes of the openings of each pair of adjacent arm modules of said plurality of arm modules being such that the opening of the upper arm module is larger than the opening of the lower arm module;

a head slider which is supported by the extending end of said plurality of arm modules and faces said disk; and an actuator which drives said plurality of arm modules;

wherein the plurality of arms of each arm module are integrated as a result of extending-end portions thereof being welded together by the laser beam which has passed through the openings of the higher arm modules.

8. A head suspension unit, used in a disk drive, comprising:

a plurality of arm modules, each of which comprises a plurality of plate-shaped arms which lie on top of each other;

said plurality of arm modules lining up vertically, and, except the lowest one, having openings through which a laser beam passes, respectively, the sizes of the openings of each pair of adjacent arm modules of said plurality of arm modules being such that the opening of the upper arm module is larger than the opening of the lower arm module; and a head slider which is supported by the extending end of said plurality of arm modules;

wherein the plurality of arms of each arm module are integrated as a result of extending-end portions thereof being welded together by the laser beam which passed through the openings of the higher arm modules.

9. A disk drive comprising:

a rotary actuator rotatable about a shaft;

at least two arms, each having a longitudinally-extending plate shape, having a proximal end and a distal end, and having a planar surface;

at least two suspensions supported by said at least two arms respectively at the distal end thereof;

at least two head sliders supported by said at least two suspensions;

a first part stacking said at least two arms in direct contact with each other at the proximal end thereof around the shaft of said rotary actuator; and a second part connecting the planar surfaces of said at least two arms together between the proximal and distal ends thereof.

10. The disk drive of claim 9, wherein each arm has a rib along a side edge thereof.

11. The disk drive as claimed in claim 9, wherein the plurality of plate-shaped arms which lie on top of each other are integrated as a result of extending-end portions thereof being fixed to each other.

12. The disk drive as claimed in claim 9, wherein the plurality of plate-shaped arms which lie on top of each other are integrated as a result of extending-end portions thereof being caused to adhere.

13. The disk drive as claimed in claim 9, wherein the plurality of plate-shaped arms which lie on top of each other are integrated as a result of extending-end portions thereof being caused to adhere by using a piece of a double-sided tape.

14. The disk drive as claimed in claim 9, wherein the plurality of plate-shaped arms which lie on top of each other are integrated as a result of extending-end portions thereof being welded together.

15. The disk drive as claimed in claim 9, comprising a plurality of arm modules, each of which comprises a plurality of plate-shaped arms which lie on top of each other, said plurality of arm modules lining up vertically, and, except the lowest one, having openings through which a laser beam passes, respectively, the sizes of the openings of each pair of adjacent arm modules of said plurality of arm modules being such that the opening of the upper arm module is larger than the opening of the lower arm module, wherein the plurality of arms of each arm module are integrated as a result of extending-end portions thereof being welded together by the laser beam which has passed through the openings of the higher arm modules.

16. The disk drive as claimed in claim 9, wherein the plurality of plate-shaped arms which lie on top of each other are integrated as a result of side faces of extending-end portions thereof being welded together.

17. The disk drive as claimed in claim 9, wherein the plurality of plate-shaped arms which lie on top of each other comprise two arms and are integrated as a result of a projection formed on one of said two arms being press-fitted into an opening formed in the other of said two arms.

18. The disk drive as claimed in claim 9, wherein the plurality of plate-shaped arms which lie on top of each other are integrated by using an eyelet member.

19. The disk drive as claimed in claim 9, wherein the plurality of plate-shaped arms which lie on top of each other are integrated as a result of extending-end portions thereof pushing each other.

20. The disk drive as claimed in claim 9, wherein the plurality of plate-shaped arms which lie on top of each other are integrated as a result of being fixed to each other through the entire length thereof.

21. The disk drive as claimed in claim 9, wherein the plurality of plate-shaped arms which lie on top of each other are integrated as a result of extending-end portions thereof being fixed to each other and portions near to base portions thereof being fixed.

22. The disk drive as claimed in claim 9, wherein the plurality of plate-shaped arms which lie on top of each other comprise two arms, a wiring path for a lead wire being formed between said two arms.

23. A head suspension assembly, used in a disk drive, comprising:

a first arm having a longitudinally-extending plate shape, having a proximal end and a distal end, and having a planar surface;

a first suspension supported by said first arm at the distal end thereof;

a first head slider supported by said first suspension;

a part of the planar surface of said first arm contacting with a planar surface of a second arm between the proximal end and distal end of the first arm, said second arm having a longitudinally-extending plate shape, having a proximal end and a distal end, and having a planar surface;

a second suspension supported by said second arm at the distal end thereof; and a second head slider supported by said second suspension.

24. The head suspension assembly as claimed in claim 23, wherein each arm has a rib along a side edge thereof.

25. The head suspension assembly as claimed in claim 23, wherein the plurality of plate-shaped arms which lie on top of each other are integrated as a result of extending-end portions thereof being fixed to each other.

26. The head suspension assembly as claimed in claim 23, wherein the plurality of plate-shaped arms which lie on top of each other are integrated as a result of extending-end portions thereof being caused to adhere.

27. The head suspension assembly as claimed in claim 23, wherein the plurality of plate-shaped arms which lie on top of each other are integrated as a result of extending-end portions thereof being caused to adhere by using a piece of a double-sided tape.

28. The head suspension assembly as claimed in claim 23, wherein the plurality of plate-shaped arms which lie on top of each other are integrated as a result of extending-end portions thereof being welded together.

29. The head suspension assembly as claimed in claim 23, comprising a plurality of arm modules, each of which comprises a plurality of plate-shaped arms which lie on top of each other, said plurality of arm modules lining up vertically, and, except the lowest one, having openings through which a laser beam passes, respectively, the sizes of the openings of each pair of adjacent arm modules of said plurality of arm modules being such that the opening of the upper arm module is larger than the opening of the lower arm module, wherein the plurality of arms of each arm module are integrated as a result of extending-end portions thereof being welded together by the laser beam which has passed through the openings of the higher arm modules.

30. The head suspension assembly as claimed in claim 23, wherein the plurality of plate-shaped arms which lie on top of each other are integrated as a result of side faces of extending-end portions thereof being welded together.

31. The head suspension assembly as claimed in claim 23, wherein the plurality of plate-shaped arms which lie on top of each other comprise two arms and are integrated as a result of a projection formed on one of said two arms being press-fitted into an opening formed in the other of said two arms.

32. The head suspension assembly as claimed in claim 23, wherein the plurality of plate-shaped arms which lie on top of each other are integrated by using an eyelet member.

33. The head suspension assembly as claimed in claim 23, wherein the plurality of plate-shaped arms which lie on top of each other are integrated as a result of extending-end portions thereof pushing each other.

34. The head suspension assembly as claimed in claim 23, wherein the plurality of plate-shaped arms which lie on top of each other are integrated as a result of being fixed to each other through the entire length thereof.

35. The head suspension assembly as claimed in claim 23, wherein the plurality of plate-shaped arms which lie on top of each other are integrated as a result of extending-end portions thereof being fixed to each other and portions near to base portions thereof being fixed.

36. The head suspension assembly as claimed in claim 23, wherein the plurality of plate-shaped arms which lie on top of each other comprise two arms, a wiring path for a lead wire being formed between said two arms.

37. A disk drive comprising:

a rotary actuator being rotatable about a shaft;

at least two arms, each having a longitudinally-extending plate shape, having a proximal end and a distal end, and having a planar surface;

a suspension supported by one of said at least two arms at the distal end thereof;

a head slider supported by said suspension;

a first part stacking said at least two arms in direct contact with each other at the proximal end thereof around the shaft of said rotary actuator; and a second part connecting the planar surfaces of said at least two arms together between the proximal and distal ends thereof.

\* \* \* \* \*